(12) United States Patent
Takazaki

(10) Patent No.: US 11,593,730 B2
(45) Date of Patent: Feb. 28, 2023

(54) SCHEDULE CREATION DEVICE, SCHEDULE CREATION METHOD, AND PROGRAM

(71) Applicant: MITSUBISHI HEAVY INDUSTRIES, LTD., Tokyo (JP)

(72) Inventor: Tatsuki Takazaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 15/734,592

(22) PCT Filed: Apr. 24, 2019

(86) PCT No.: PCT/JP2019/017424
§ 371 (c)(1),
(2) Date: Dec. 3, 2020

(87) PCT Pub. No.: WO2020/044657
PCT Pub. Date: Mar. 5, 2020

(65) Prior Publication Data
US 2021/0232998 A1    Jul. 29, 2021

(30) Foreign Application Priority Data
Aug. 31, 2018 (JP) .............................. JP2018-163714

(51) Int. Cl.
*G06Q 10/06* (2012.01)
*G06Q 50/04* (2012.01)
(Continued)

(52) U.S. Cl.
CPC .................. *G06Q 10/06312* (2013.01); *G05B 19/41865* (2013.01); *G06Q 10/06393* (2013.01); *G06Q 50/04* (2013.01); *G05B 2219/31023* (2013.01)

(58) Field of Classification Search
None
See application file for complete search history.

(56) References Cited

U.S. PATENT DOCUMENTS 9,953,287 B1 *  4/2018  McDonald, Jr. .......... B64D 1/02
10,692,165 B2 *  6/2020  Mohr ...................... G06Q 50/28
(Continued)

FOREIGN PATENT DOCUMENTS

EP        2876066 A1     5/2015
JP       06328112 A     11/1994
(Continued)

OTHER PUBLICATIONS

Seelinger et al. "Automatic Pallet Engagment by a Vision Guided Forklift" (2005) (https://ieeexplore.ieee.org/stamp/stamp.jsp?tp=&arnumber=1570744) (Year: 2005).*

(Continued)

*Primary Examiner* — Sujay Koneru
(74) *Attorney, Agent, or Firm* — Kanesaka Berner and Partners LLP

(57) ABSTRACT

Provided is a schedule creation device for creating a conveyance schedule according to which a conveyance device conveys a product to work positions designated for each manufacturing process. Said schedule creation device sets a first score to the work positions and to a conveyance path of the conveyance device; sets a second score for products; and uses the first score and the second score to determine the product to be conveyed by the conveyance device from among products present at a plurality of work positions.

11 Claims, 17 Drawing Sheets

(51) Int. Cl.
  *G05B 19/418* (2006.01)
  *G06Q 10/0631* (2023.01)
  *G06Q 10/0639* (2023.01)

(56) References Cited

U.S. PATENT DOCUMENTS

| | | | |
|---|---|---|---|
| 2001/0032032 A1* | 10/2001 | Matsumoto | B60P 1/6445 700/213 |
| 2003/0069774 A1* | 4/2003 | Hoffman | G06Q 30/0201 705/7.29 |
| 2004/0078109 A1* | 4/2004 | Babikian | G05B 19/41865 700/121 |
| 2007/0143131 A1* | 6/2007 | Kasper | G06Q 10/063 706/19 |
| 2007/0282475 A1* | 12/2007 | Schmidt | G05B 19/41865 700/99 |
| 2007/0282618 A1* | 12/2007 | Barahona | G06Q 10/08355 705/338 |
| 2008/0167743 A1* | 7/2008 | Volant | G06Q 10/06 700/99 |
| 2008/0167817 A1* | 7/2008 | Hessler | G01C 21/005 701/514 |
| 2009/0099686 A1 | 4/2009 | Yoshikawa et al. | |
| 2010/0312860 A1* | 12/2010 | Lohstoeter | G06Q 10/08 709/219 |
| 2011/0071955 A1* | 3/2011 | Nakamura | G06Q 10/08355 705/338 |
| 2011/0320460 A1* | 12/2011 | Fankhauser | G06Q 10/10 707/E17.084 |
| 2013/0166055 A1* | 6/2013 | Ishibashi | G06Q 10/08 700/100 |
| 2013/0166468 A1* | 6/2013 | Vogelgesang | G06Q 10/087 705/330 |
| 2014/0279294 A1* | 9/2014 | Field-Darragh | G06Q 30/0282 705/28 |
| 2014/0343711 A1* | 11/2014 | Aqlan | G05B 19/41865 700/101 |
| 2014/0358703 A1* | 12/2014 | Stuntebeck | G07C 9/32 705/330 |
| 2015/0106224 A1* | 4/2015 | Stevens | G06Q 30/0631 705/26.7 |
| 2015/0269520 A1* | 9/2015 | Knapp | G06Q 10/08355 705/338 |
| 2016/0139592 A1* | 5/2016 | Aqlan | G05B 19/41865 700/100 |
| 2016/0229631 A1* | 8/2016 | Kimura | G06Q 10/08 |
| 2017/0161663 A1* | 6/2017 | Miele | G06Q 10/06315 |
| 2017/0220994 A1* | 8/2017 | Fujita | G06Q 50/28 |
| 2018/0104778 A1* | 4/2018 | Hirai | G06Q 10/06 |
| 2018/0150066 A1* | 5/2018 | Chen | G05B 19/41865 |
| 2018/0244488 A1* | 8/2018 | Keller | B65H 39/075 |
| 2018/0300834 A1* | 10/2018 | High | G06Q 50/28 |
| 2018/0322452 A1* | 11/2018 | Millhouse | G06Q 10/08355 |
| 2018/0333847 A1* | 11/2018 | Ma | G05D 1/02 |
| 2018/0365605 A1* | 12/2018 | Kurokawa | G06Q 10/067 |
| 2019/0043015 A1* | 2/2019 | Nakano | G06Q 10/08355 |
| 2019/0135549 A1* | 5/2019 | Kilibarda | B65G 35/06 |
| 2019/0164128 A1* | 5/2019 | Millhouse | H04L 67/12 |
| 2019/0180229 A1* | 6/2019 | Phillips | G06Q 10/0833 |
| 2019/0310610 A1* | 10/2019 | Ohashi | G05B 19/418 |
| 2019/0310615 A1* | 10/2019 | Shan | G06Q 10/06313 |
| 2019/0318307 A1* | 10/2019 | Higashida | G06Q 10/0838 |
| 2019/0340550 A1* | 11/2019 | Denger | G06Q 10/0631 |
| 2019/0347613 A1* | 11/2019 | Sakai | G06Q 10/087 |
| 2019/0392363 A1* | 12/2019 | Kohli | G06Q 50/04 |
| 2019/0392380 A1* | 12/2019 | O'Brien | G06Q 10/087 |
| 2020/0293028 A1* | 9/2020 | Tadano | G06Q 10/06 |
| 2020/0393849 A1* | 12/2020 | Ishikawa | G05D 1/0293 |
| 2020/0398916 A1* | 12/2020 | Finke | G05D 1/0234 |
| 2021/0398045 A1* | 12/2021 | Hanebeck | G06Q 10/06315 |

FOREIGN PATENT DOCUMENTS

| | | | | |
|---|---|---|---|---|
| JP | 2000039905 A | | 2/2000 | |
| JP | 2001117624 A | | 4/2001 | |
| JP | 2004334797 A | | 11/2004 | |
| JP | 2005122405 A | | 5/2005 | |
| JP | 2009227354 A | | 10/2009 | |
| JP | 2019015711 A | * | 1/2019 | B60L 53/00 |
| WO | 2006120783 A1 | | 11/2006 | |
| WO | 2014013609 A1 | | 1/2014 | |

OTHER PUBLICATIONS

International Search Report and Written Opinion of International Application No. PCT/JP2019/017424 filed Apr. 24, 2019; 13pp.

* cited by examiner

FIG. 10

| TRANSPORT SCHEDULE | DATE | MM/DD | | | | | 14 |
|---|---|---|---|---|---|---|---|
| | HOUR | | | 13 | | | |
| | MINUTE | 0 | 15 | 30 | 45 | 0 | ... |
| TRANSPORT DEVICE #1 | From | B | C5 | F2 | E2 | A | ... |
| | To | C6 | D2 | G | F2 | B | ... |
| | PRODUCT NAME | 715 LL | 713 LU | 714 RL | 712 LU | 715 LR | ... |

US 11,593,730 B2

SCHEDULE CREATION DEVICE, SCHEDULE CREATION METHOD, AND PROGRAM

RELATED APPLICATIONS

The present application is a National Phase of International Application Number PCT/JP2019/017424 filed Apr. 24, 2019 and claims priority to Japanese Application Number 2018-163714 filed Aug. 31, 2018.

TECHNICAL FIELD

The present invention relates to a schedule creation device, a schedule creation method, and a program.

This application claims priority based on Japanese Patent Application No. 2018-163714, filed on Aug. 31, 2018, the content of which is incorporated herein by reference.

BACKGROUND ART

In a production line of a factory or the like, for each production process, a product is completed while moving a product being manufactured to each production facility to be used in the process. In such a factory, a transport device may be used to move a product. A worker manually creates a transport schedule of the transport device based on a production schedule of the product in consideration of a use situation or the like of each production facility in many cases.

As the related art, PTL 1 discloses an operation scheduling device that simulates movement of a product and a transport device to create a plurality of operation schedules based on information, such as a current position of the product, a transport path, and a current operation situation of the transport device, and selects an optimum operation schedule from among the operation schedules.

CITATION LIST

Patent Literature

[PTL 1] Japanese Unexamined Patent Application Publication No. H6-328112

SUMMARY OF INVENTION

Technical Problem

However, the manual creation of the transport schedule of the transport device takes a lot of time or labor, and a burden on a person in charge is large. For example, in an actual production line, a production schedule should be changed for various reasons. In a case where change occurs in the production schedule, additional work for manually recreating a transport schedule in conformity with the change is generated, and a burden on the person in charge increases.

The invention provides a schedule creation device, a schedule creation method, and a program capable of solving the above-described problem.

Solution to Problem

According to an aspect of the invention, there is provided a schedule creation device that creates a transport schedule of a transport device on which a product is transported to a work position determined for each production process by the transport device, the schedule creation device including a schedule creation unit that sets a first score to the work position and a transport path of the transport device, sets a second score to the product, and decides the product to be transported by the transport device from among the products present at a plurality of the work positions based on the first score and the second score.

According to the aspect of the invention, the schedule creation unit sets the first score based on whether or not passage of the transport device to the work position and the transport path is possible and sets, based on a preset priority of each work position, the second score of the product present at the work position.

According to the aspect of the invention, the schedule creation unit sets the first score to the work position based on presence or absence of the product present at the work position and a situation of production work to the product.

According to the aspect of the invention, the schedule creation unit sets the second score based on a work start time at the work position determined in a predetermined production schedule in addition to the priority of each work position.

According to the aspect of the invention, the schedule creation unit updates the first score of the transport path, through which the transport device transporting the product passes, based on the second score of the product that is transported by the transport device.

According to the aspect of the invention, in the schedule creation device, the first score is set to a greater value as passage of the transport device is harder, the second score is set to a greater value as a priority of production work of the product with the second score set is higher, and the schedule creation unit selects the product having the second score set to a greater value than the first score set to the transport path of the product, to which the second score is set, as a transport candidate.

According to the aspect of the invention, the schedule creation unit decides to retract the product, to which a maximum second score is set, in a case where there is no product to which the second score greater than the first score set to the transport path of the product is set.

According to the aspect of the invention, in a case where there are a plurality of the transport devices, the schedule creation unit sets the first score of the transport path, through which the transport device having already decided the product to transport passes, to a value such that passage of another transport device is impossible.

According to the aspect of the invention, when the product is allocated to the transport device, the schedule creation unit calculates a correspondence relationship between the work position after the product is transported and the product, calculates the first score after transport and the second score of the product based on the correspondence relationship, and decides the product to be transported next.

According to an aspect of the invention, there is provided a schedule creation method for a schedule creation device that creates a transport schedule of a transport device on which a product is transported to a work position determined for each production process by the transport device, the schedule creation method including a step of setting a first score to the work position and a transport path of the transport device, a step of setting a second score to the product, and a step of deciding the product to be transported by the transport device from among the products present at a plurality of the work positions based on the first score and the second score.

According to an aspect of the invention, there is provided a program that causes a computer of a schedule creation device to function as, in creating a transport schedule of a transport device on which a product is transported to a work position determined for each production process by the transport device, means for setting a first score to the work position and a transport path of the transport device, means for setting a second score to the product, and means for deciding the product to be transported by the transport device from among the products present at a plurality of the work positions based on the first score and the second score.

Advantageous Effects of Invention

With the schedule creation device, the schedule creation method, and the program described above, it is possible to automatically create a transport schedule of a transport device.

BRIEF DESCRIPTION OF DRAWINGS

FIG. 10 is a diagram showing an example of a schedule created by the schedule creation device in the embodiment of the invention.

DESCRIPTION OF EMBODIMENTS

Embodiment

Hereinafter, a schedule creation method according to the embodiment of the invention will be described referring to FIGS. 1 to 17.

Figure 1:
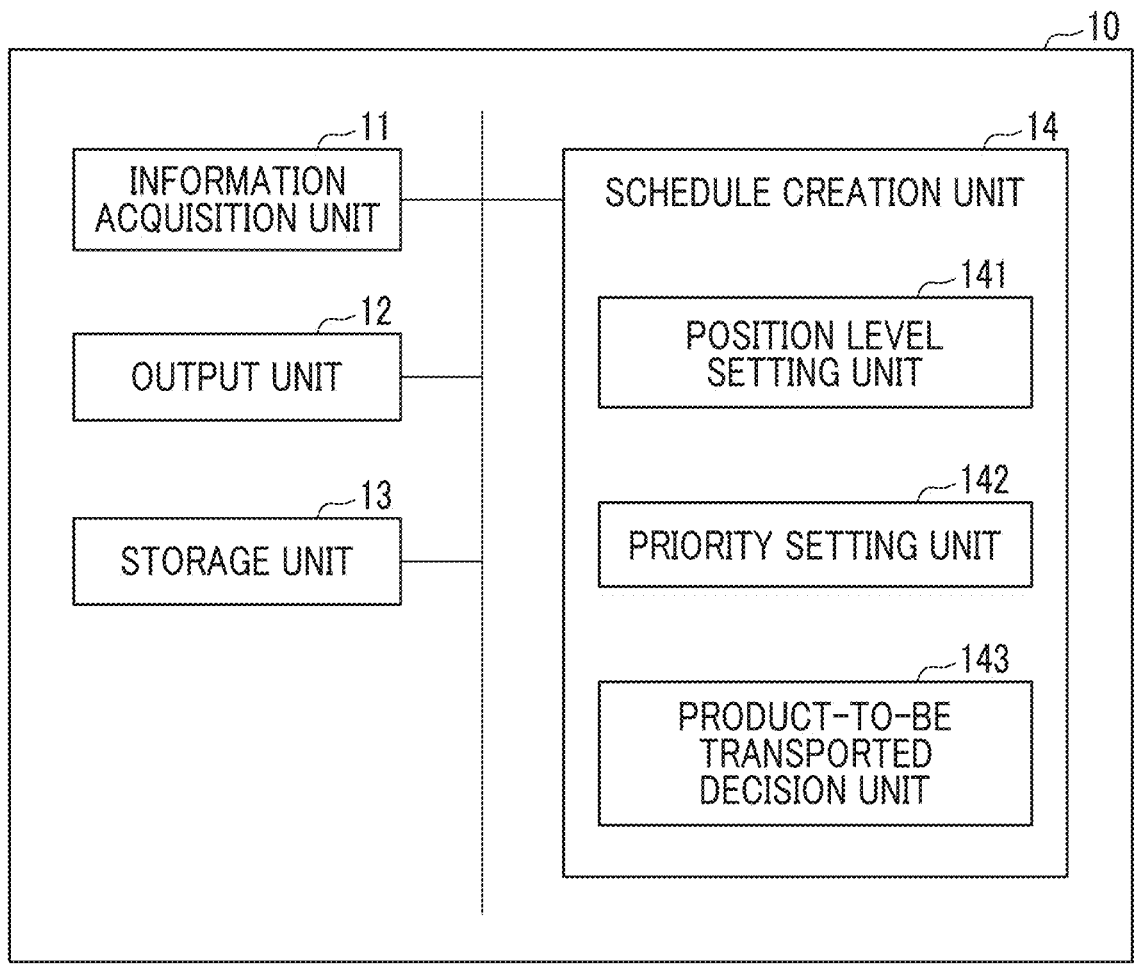
FIG. 1 is a block diagram of a schedule creation device in an embodiment of the invention.

FIG. 1 is a block diagram of a schedule creation device in the embodiment of the invention.

A schedule creation device 10 creates a transport schedule of a transport device in a production line of a factory or the like that performs machining or the like at a work position determined for each production process to manufacture a product. At the work position of each production process, a production facility or the like necessary for the production process is provided. When one production process ends, a transport device, such as an automated guided vehicle (AGV), transports a product being manufactured to a work position where a facility of a next production process is provided. A timetable (production schedule) relating to a production process of each product is determined in advance. That is, the production schedule that production work is performed for which product at which work position from when to when is provided from the outside. The number of transport devices is limited, and a predetermined time is needed to transport a product to the next work position. The transport device is required to transport each product to the next work position such that production work can be started as the production schedule. The schedule creation device 10 plans what time should the transport device transport a product being manufactured from which work position to which another work position under the restrictions and outputs the plan information (the transport schedule of the transport device). In the specification, not only a product as a final form for which all production processes end but also a product being manufactured is described as a product.

As shown in FIG. 1, the schedule creation device 10 includes an information acquisition unit 11, an output unit 12, a storage unit 13, and a schedule creation unit 14.

The information acquisition unit 11 acquires information necessary for schedule creation, such as a production schedule or the number of transport devices that can be used for transport.

The output unit 12 outputs a created transport schedule of a transport device to other devices, such as a display device.

The storage unit 13 stores various kinds of information, such as various pieces of data acquired by the information acquisition unit 11, data during schedule creation processing, and the created schedule.

The schedule creation unit 14 creates a transport schedule of a transport device. The schedule creation unit sets scores to each product, a work position, and a transport path, through which a transport device passes when moving between the work positions, according to a predetermined rule, and decides a product to be transported based on the set scores. The schedule creation unit 14 includes a position level setting unit 141, a priority setting unit 142, and a product-to-be-transported decision unit 143. The functional units will be described below referring to FIGS. 2 to 9.

Figure 2:
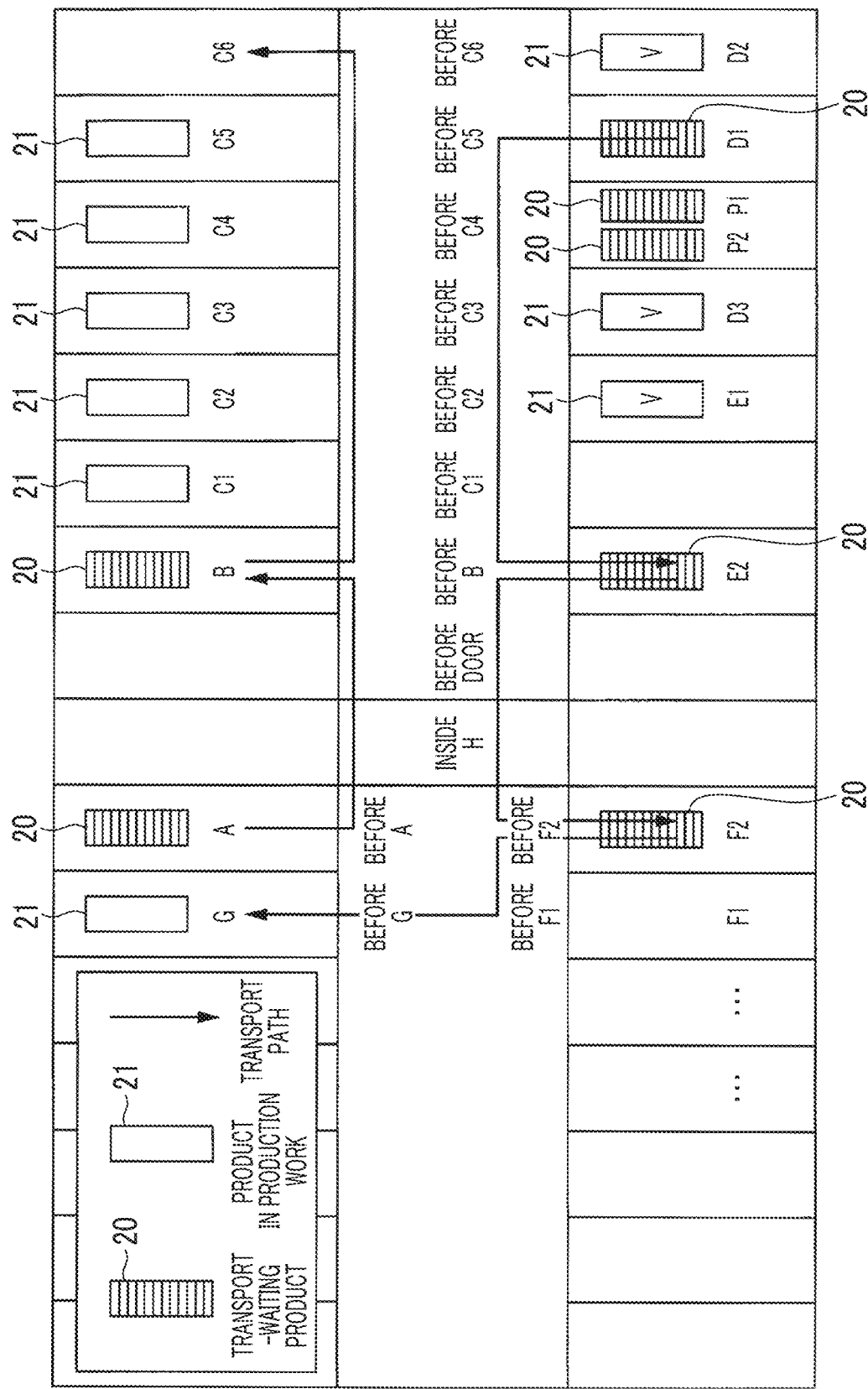
FIG. 2 is a first view illustrating schedule creation processing in the embodiment of the invention.

FIG. 2 is a first view illustrating schedule creation processing in the embodiment of the invention.

An example of a production line for transport schedule creation of a transport device in the embodiment will be described referring to FIG. 2. The drawing is a plan view (schematic view) of a certain production line. Each section attached with G, A, or the like is a work position according to a production process. As described above, the work position is determined for each production process. Specifically, when the production processes are referred to as processes 1 to 7 in a process order, the work of the process 1 is performed at a work position A, the process 2 is performed at a work position B, the process 3 is performed at a work position C, the process 4 is performed at a work position D, the process 5 is performed at a work position E, the process 6 is performed at a work position F, and the process 7 is performed at a work position G. For example, with the progress of the production processes, a product is moved in an order of the work position A, B or C, D, E, F, and G, and the transport device loads and transports the product between the work positions. A position attached with a numeral after the same alphabet indicates that a plurality of work positions of the same production process are present. For example, C1 to C6 represent that six work positions C where the process 3 is performed are provided. The same applies to D1 to D3, E1 and E2, and F1 and F2.

P1 and P2 are retraction places. The places are places that, even though a product with a high priority is desired to be transported to a work position of a next process, in a case where a worked product is provided at the work position, or the like, are used to temporarily retract the worked product.

Products 20 represent transport-waiting products. That is, the products 20 are products that are waiting for movement to the next work position (production process) after production work at the work position ends. Products 21 are products in production work. The products 21 are in work and are not a transport target at the moment. For example, at the work position G, production work of a final process is being performed for the product 21. At the work position A, production work of the process 1 ends and the product 20 is waiting. Similarly, at the work position B, production work of the process 2 ends and the product 20 is waiting. At the work position C6, the product 20 or 21 is not disposed, and the product 20 that is waiting in a previous process can be received. The work position where or the time when each product 20 or 21 is disposed is determined by the production schedule.

A place, such as before G or before A, is a transport path through which a transport device passes. As indicated by arrows, in the example of FIG. 2, in order to advance the production processes, the product 20 at the work position A is moved to the work position B, and the product 20 at the work position B is moved to the work position C6. The product 20 at the work position D1 is moved to the work position E2, and the product 20 at the work position E2 is moved to the work position F2. For example, in a case of moving the product 20 from the work position A to the work position B, the product 20 passes through a transport path including before A, inside H, before a door, before B, and the like.

In a case of moving the product 20 from a certain work position to another work position, a given time (for example, 15 minutes) is taken. For example, in a case where there are a plurality of transport devices, when a plurality of transport devices can be moved so as not to collide with one another, a plurality of products 20 can be simultaneously moved in parallel. However, when there is only one transport device, one product 20 to be prioritized the most is selected and moved to the next work position.

The schedule creation device 10 creates the transport schedule of the transport device under restrictions of a priority of production work (a priority of a product), the number of transport devices, the absence of another product 20 or 21 at a transport destination, and in a case where there are a plurality of transport devices, prevention of the transport devices from colliding with one another during traveling. Hereinafter, each functional unit of the schedule creation unit 14 will be described assuming the matters described referring to FIG. 2. The matters (the production schedule including the work position and a work time of each product 20 or 21, the relationship between the production process and the work position, the transport path, and the number of transport devices) described referring to FIG.

2 are input to the schedule creation device 10 as initial conditions in schedule creations, and the information acquisition unit 11 acquires the input information and stores the acquired information in the storage unit 13.

Figure 3:
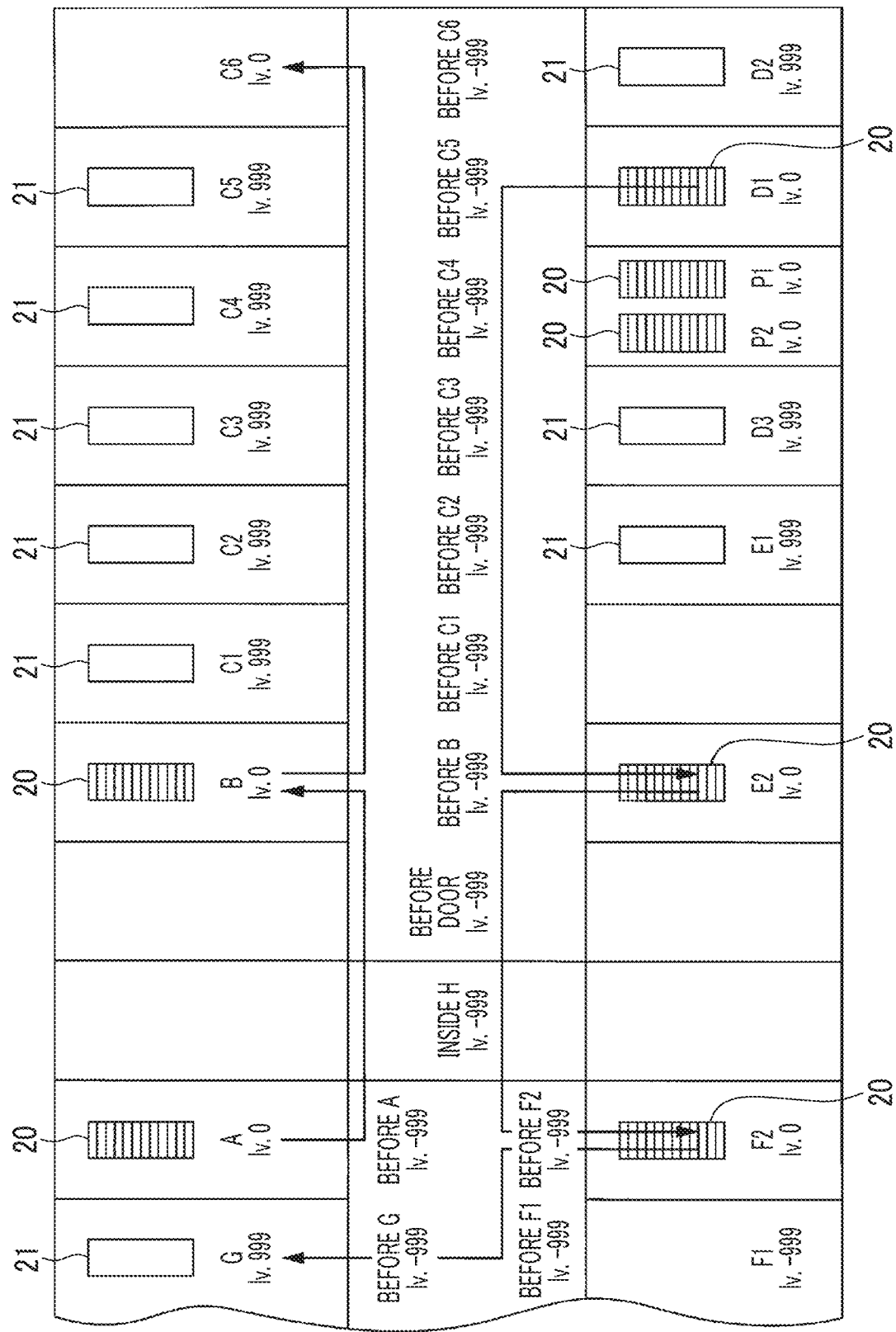
FIG. 3 is a second view illustrating the schedule creation processing in the embodiment of the invention.

FIG. 3 is a second view illustrating the schedule creation processing in the embodiment of the invention. The function of the position level setting unit 141 will be described referring to FIG. 3.

The position level setting unit 141 sets a position level to each work position based on the work position where the product 20 or 21 is disposed. For example, as the position level of the work position where the product 21 in work is disposed, "999" meaning that the transport device cannot pass through the work position is set. For example, the products 21 are present at the work positions C1 to C5. For this reason, the position level setting unit 141 sets the position level "999" to the work positions C1 to C5. The same applies to the work positions D2, D3, E1, and G.

The position level setting unit 141 sets "0" as a value of the position level to the work position where the transport-waiting product 20 is present. For example, "0" is set to the work positions (A, B, D1, E2, and F2) where the products 20 are present and the work positions (under a condition that the position level 999 is not set) as transport destinations.

The position level setting unit 141 sets "−999" as the value of the position level on other empty work positions (work position F1).

The position level setting unit 141 also sets "−999" indicating an empty position as a value of a position level of each transport path (before G, before A, before B, before C1, or the like).

In this way, the position level setting unit 141 sets a position level of a small value to a place through which the transport device can pass and sets a position level of a large value to a place through which the transport device should not pass. Description of "lv=999" or the like of FIG. 3 indicates the position level.

Next, the function of the priority setting unit 142 will be described referring to FIGS. 4 to 6.

Figure 4:
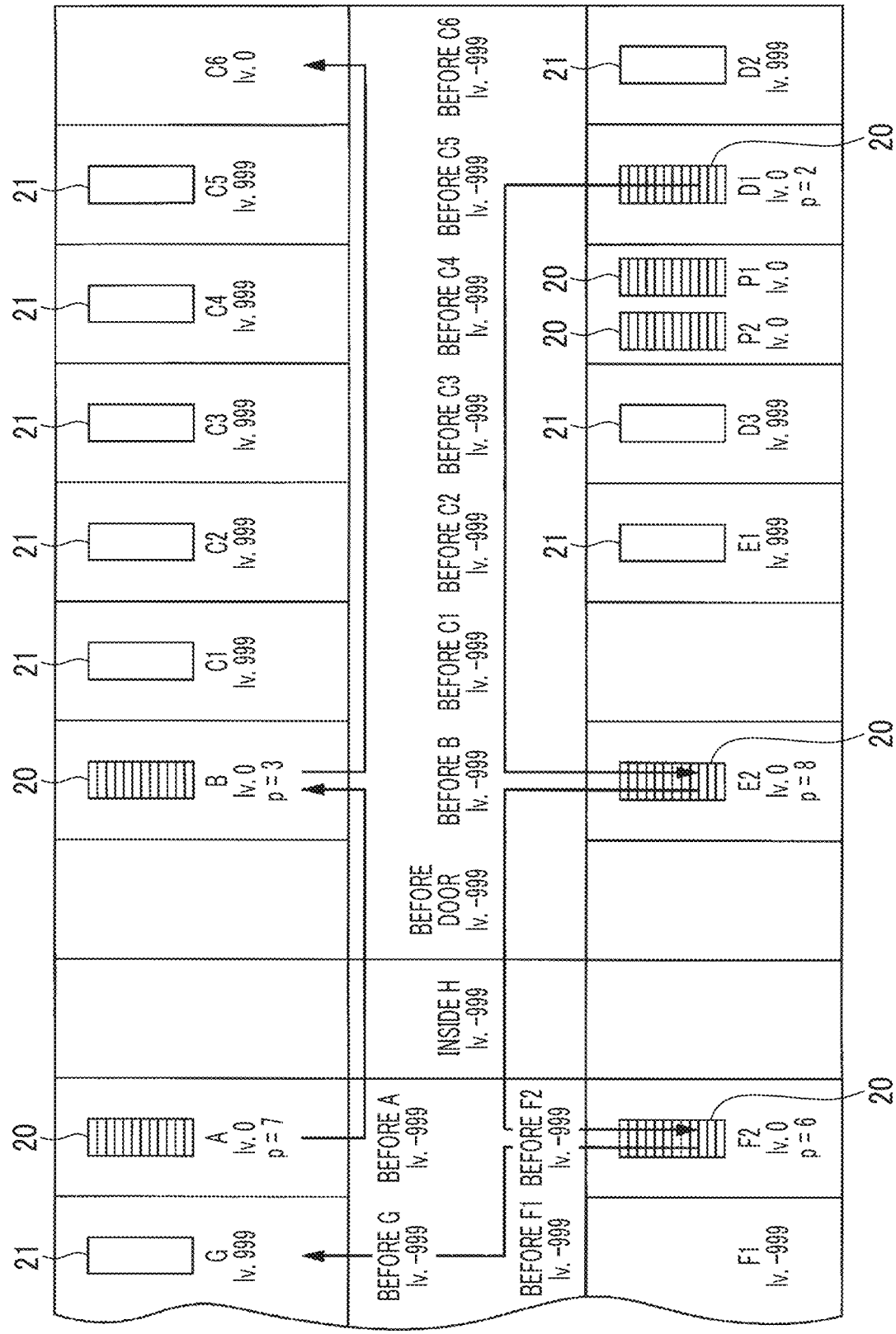
FIG. 4 is a third view illustrating the schedule creation processing in the embodiment of the invention.

FIG. 4 is a third view illustrating the schedule creation processing in the embodiment of the invention. The priority setting unit 142 sets a high priority to a product for which production work should be performed with priority. (1) First, the priority setting unit 142 sets a priority to the transport-waiting products 20 based on the work positions where the products 20 are disposed. A priority is set to each work position (production process) in advance. For example, the highest priority "8" is set to the work positions F1 and F2, a priority "7" is set to the work position B, and a priority "6" is set to the work position G. In addition, a priority "5" is set to the work position A, a priority "3" is set to the work positions D1 to D3, and a priority "2" is set to the work positions E1 to E2. The relationship between the work position and the priority is registered in the storage unit 13 in advance. The priority setting unit 142 sets the priority to the product 20 in compliance with the relationship between the work position and the priority. For example, the priority setting unit 142 sets the highest priority "8" to the product 20 of the work position E2 that is scheduled to be machined next at the work position F2 with the highest priority (P=8). This is based on that the product 20 should be transported to the work position F2 first since work should be performed at the work position F2 first. Similarly, the priority setting unit 142 sets the priority "7" to the product 20 at the work position A that is scheduled to be carried in the work position B such that work can be started as soon as possible at the work position B where production work needs to be performed with next highest priority. The same applies to other products 20.

In this way, the priority setting unit 142 sets a priority of a greater value to the product 20 that should be transported to the next work position with priority. Description of p=8 or the like of FIG. 4 indicates the priority.

Figure 5:
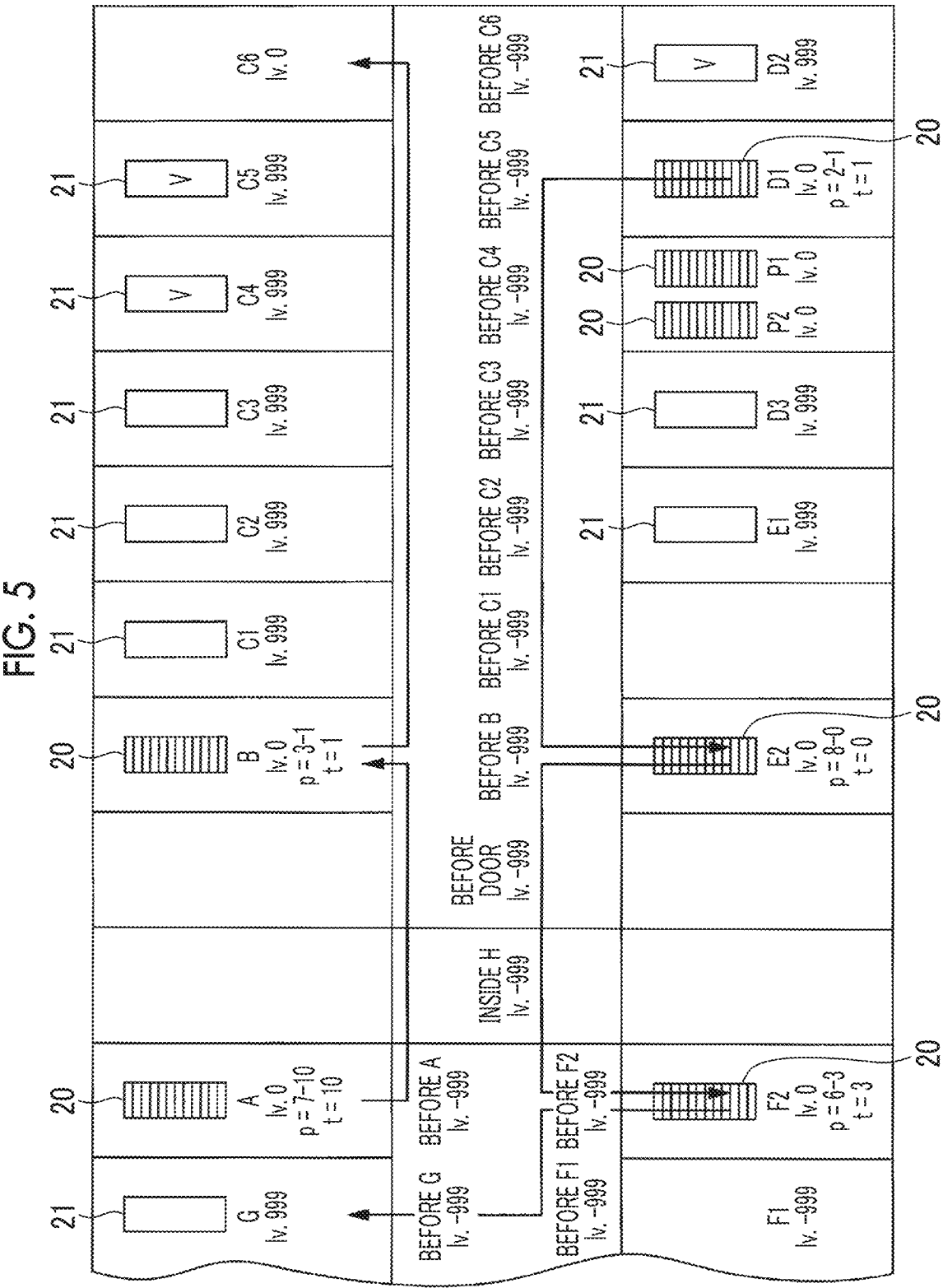
FIG. 5 is a fourth view illustrating the schedule creation processing in the embodiment of the invention.

FIG. 5 is a fourth view illustrating the schedule creation processing in the embodiment of the invention. (2) Next, the priority setting unit 142 calculates the possible number of times of transport and subtracts the calculated possible number of times of transport from the previously set priority to update the priority on the transport-waiting products 20. Here, the possible number of times (t) of transport is a value obtained by dividing a time until a production work start time at the work position determined by the production schedule by a time needed for transport. For example, when the time until the production work start time at the work position B is 60 minutes and a movement time from the work position A to the work position B is 15 minutes, the possible number of times of transport is four. A movement time (a time needed for transport) between the respective work positions is registered in the storage unit 13 in advance. The priority setting unit 142 calculates the possible number of times of transport of each of the products 20 with the priority set in (1) with reference to the production schedule and the movement time between the respective work positions registered in the storage unit 13. Description of t=10 or the like of FIG. 5 indicates the possible number of times of transport. Next, the priority setting unit 142 subtracts the possible number of times t of transport from a priority p to update priority. For example, the priority of the product 20 at the work position A is 7−10=−3. In a case where the value after update is a negative value, the priority setting unit 142 corrects the priority having the negative value to a predetermined positive value (minimum value, for example, "1"). The priority setting unit 142 executes the same processing on all transportable products 20 (the products 20 at the work positions B, D1, E2, and F2) other than the work position A. Then, the priority of the products 20 at the work positions A, B, D1, E2, and F2 after update is "1", "2", "1", "8", and "3", respectively.

Figure 6:
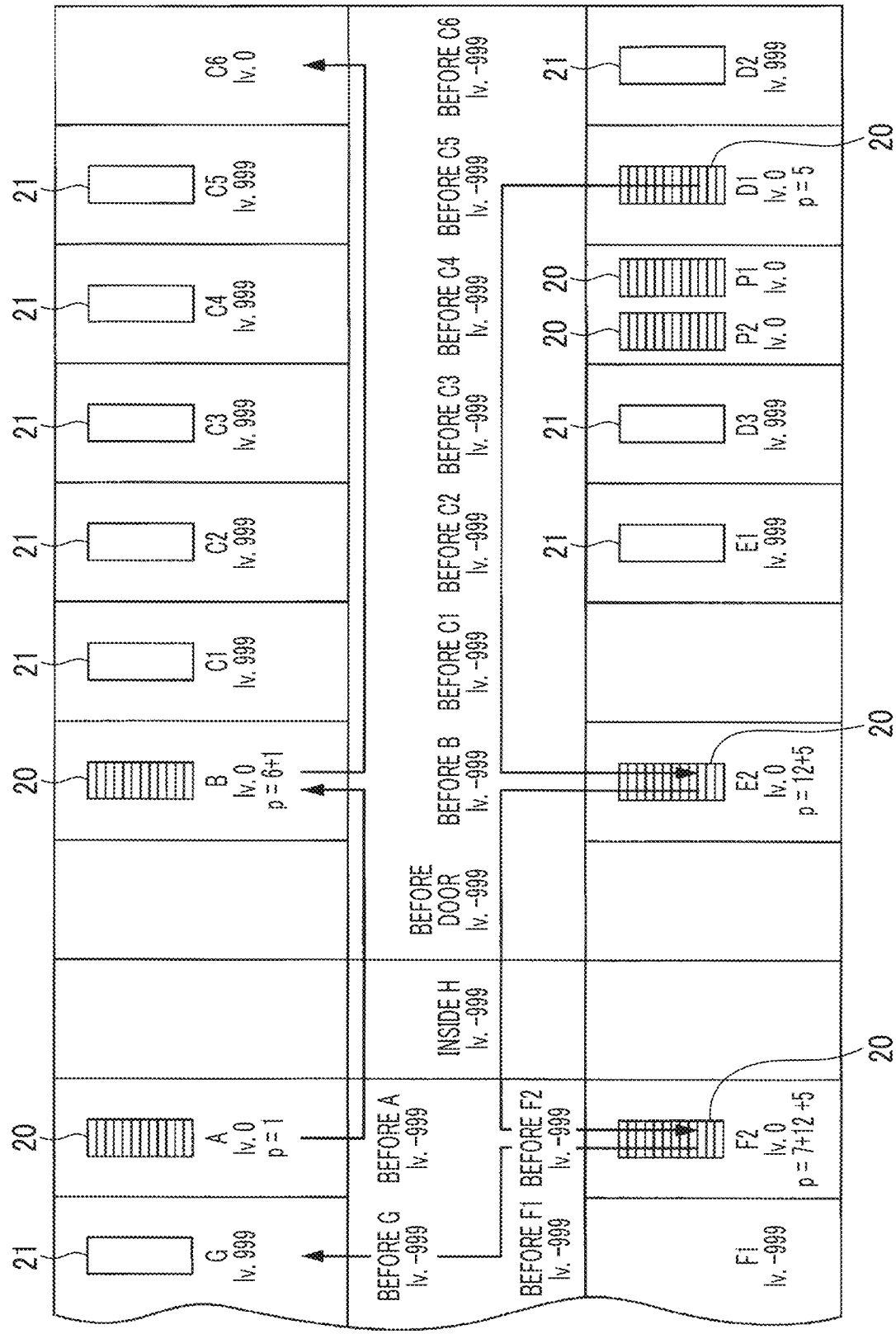
FIG. 6 is a fifth view illustrating the schedule creation processing in the embodiment of the invention.

FIG. 6 is a fifth view illustrating the schedule creation processing in the embodiment of the invention. (3) Next, the priority setting unit 142 increases the priority of the product 20 that should be retracted in order to transport the product. For example, even though the priority of the transport-waiting product 20 is high, in a case where there is another product at the transport destination of the product 20, the product with a high priority cannot be transported to the transport destination when another product at the transport destination is not retracted. Accordingly, the priority of the product 20 or the like at a transport source is added to the priority of the product 20 or the like at the transport destination to increase the priority of the product 20 or the like to be retracted. Note that, in a case where there is a place of which the value of the position level is "999" in a transport path, the products 20 of the work positions where a transport device does not reach without passing through the transport path are not subjected to priority addition. For example, in FIG. 6, the priority setting unit 142 adds the priority ("1") of the product 20 at the work position A to the priority ("6") of the product 20 at the work position B. Similarly, the priority setting unit 142 adds the priority ("5") of the product 20 at the work position D1 to the priority ("12") of the product 20 at the work position E2. In addition, the priority setting unit 142 adds the priority ("12+5") of the product 20 at the work position E2 to the priority ("7") of the product 20 at the work position F2.

The priority setting unit 142 registers the product 20 with a priority having a maximum value among the priorities after addition in the storage unit 13 as a product for retraction. In the example of FIG. 6, the product for retraction is the product 20 (priority=24) at the work position F2.

Next, a function of setting a position level of a transport path of the position level setting unit 141 will be described referring to FIG. 7.

Figure 7:
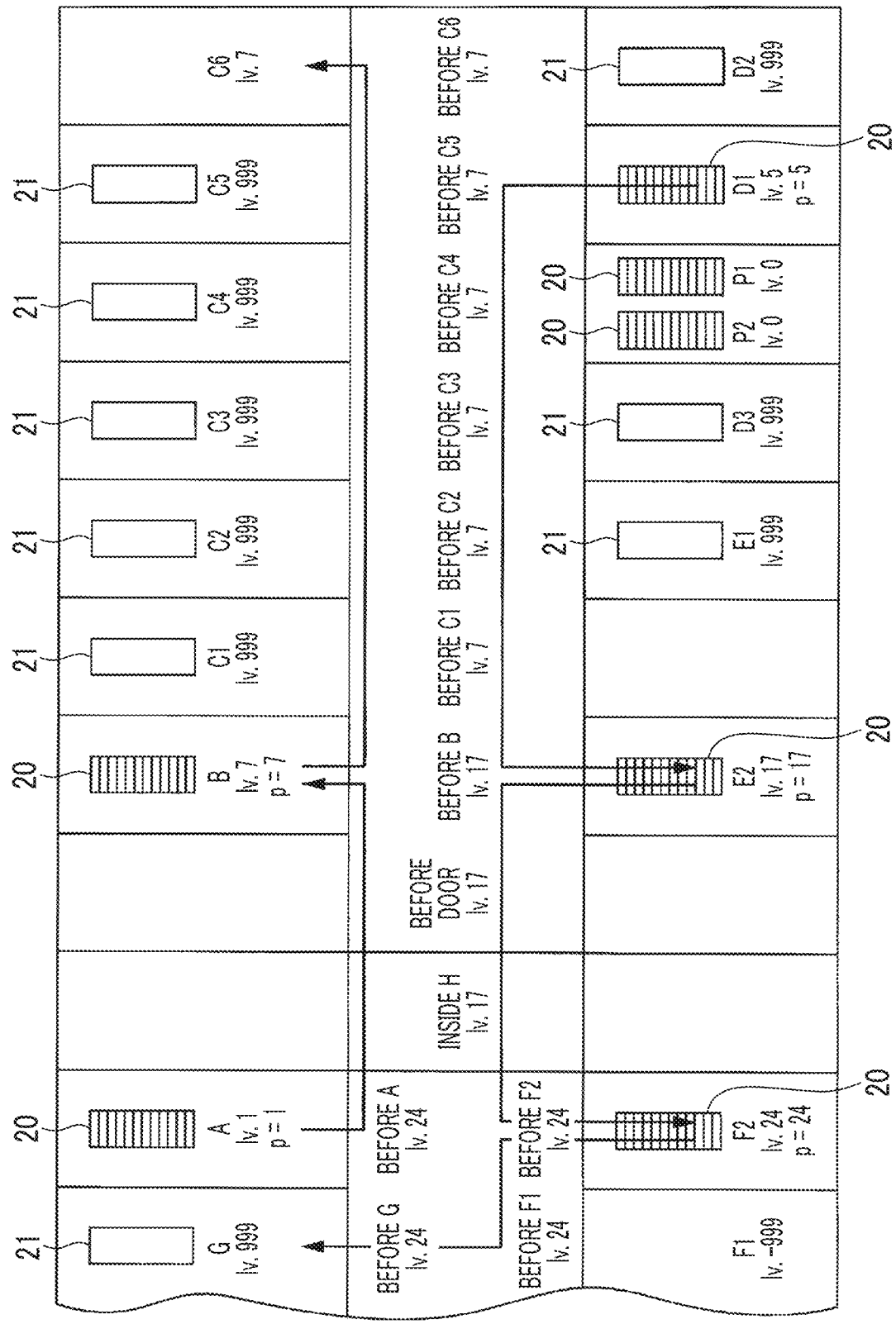
FIG. 7 is a sixth view illustrating the schedule creation processing in the embodiment of the invention.

FIG. 7 is a sixth view illustrating the schedule creation processing in the embodiment of the invention. In a case where a plurality of products 20 pass through the same transport path, in order to prevent the transport device transporting a product 20 with a relatively low priority from passing through the transport path (since movement of a product 20 with a high priority is obstructed), the position level setting unit 141 sets a maximum value among the priorities of the products 20 passing through the transport path as the position level of the transport path. With this, the product 20 to which a relatively low priority is set is prevented from passing through the transport path. The work positions (the work positions having the position level "999") through which a transport device should not pass and transport paths before the work positions are not subjected to update of a position level to a transport path. For example, the position level setting unit 141 sets a position level "24" to a transport path (the work position F2 and a transport path including before F2, before A, before F1, and before G) of the product 20 at the work position F2 having the highest priority "24". The position level setting unit 141 sets a position level "17" to a transport path (the work position E2 and a transport path including before B, before the door, and inside H) of the product 20 of the work position E2 having the next highest priority "17". The position level setting unit 141 sets a position level "7" to a transport path (the work positions B and C6 and a transport path including before C1 to before C6) of the product 20 at the work position B having the next highest priority "7".

Next, the function of the product-to-be-transported decision unit 143 will be described referring to FIGS. 8 and 9.

Figure 8:
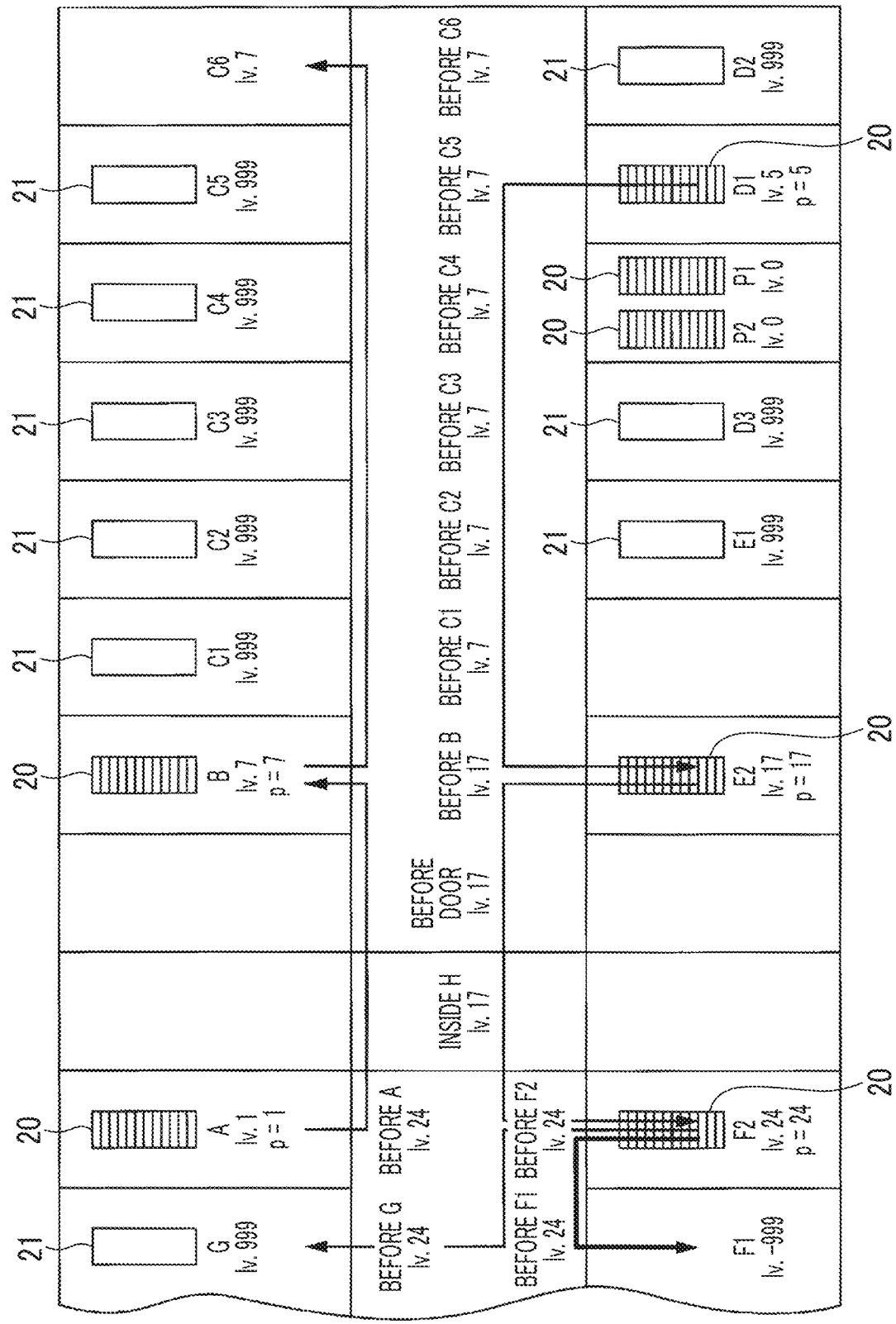
FIG. 8 is a seventh view illustrating schedule creation processing in the embodiment of the invention.

FIG. 8 is a seventh view illustrating the schedule creation processing in the embodiment of the invention. The product-to-be-transported decision unit 143 decides a product to be transported next based on the position level and the priority. Specifically, the product-to-be-transported decision unit 143 decides the product 20 with the highest priority as a transport target. However, the product-to-be-transported decision unit 143 compares the position level of the transport path with the priority of the product 20, and in a case where there is a place satisfying "the priority <the position level" on the transport path, does not decide the product as a transport target. For example, in FIG. 8, since a transport path (for example, before C1 to before C5) of the product 20 at the work position D1 is given the position level "7" greater than the priority "5" of the product 20, the product-to-be-transported decision unit 143 does not decide the product 20 at the work position D1 as a transport target. While the product-to-be-transported decision unit 143 decides a product in a descending order of the priority as a transport target, in FIG. 8, the product 20 at the work position F2 having the highest priority "24" cannot be transported to the work position G since the position level of the work position G as a transport destination is "999". Due to this, the product 20 at the work position E2 with the next highest priority cannot be transported to the work position F2. In such a situation, in a case where a product to be retracted is registered in the storage unit 13 (a product for retraction described referring to FIG. 6), the product-to-be-transported decision unit 143 decides to retract the product for retraction (to transport the product for retraction to the nearest empty position). In the example of FIG. 8, the product 20 at the work position F2 having the updated value of the highest priority is retracted to the work position F1 as an empty position.

Figure 9:
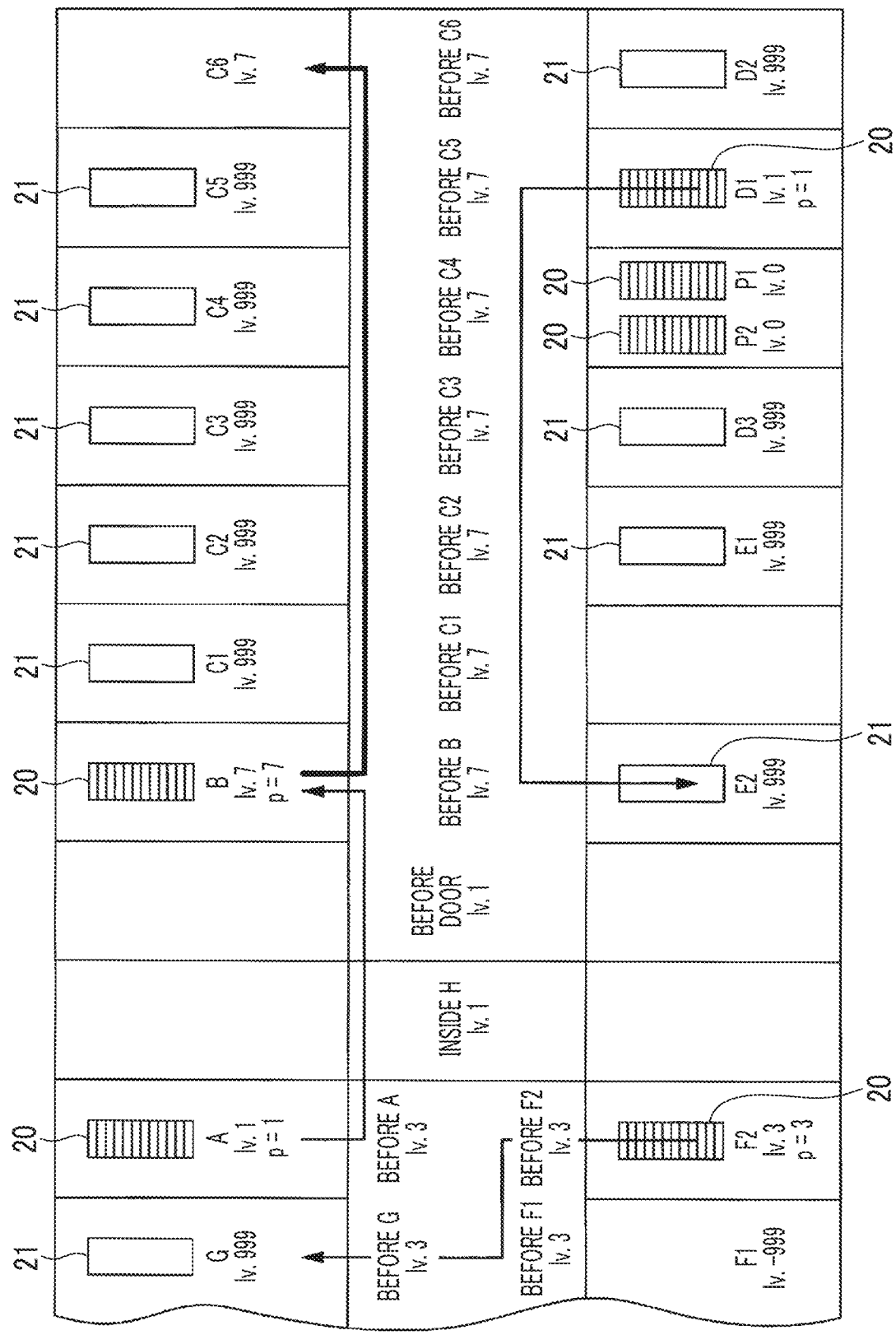
FIG. 9 is an eighth view illustrating the schedule creation processing in the embodiment of the invention.

FIG. 9 is an eighth view illustrating the schedule creation processing in the embodiment of the invention. FIG. 9 illustrates a case where a transportable product 20 is present. In FIG. 9, unlike the above-described examples, production work is being performed at the work position E2 to which the highest priority is set (lv=999). In regard to the transport-waiting products 20, the product 20 at the work position B has the highest priority, and there is no place, to which a priority higher than the priority of the product 20 is set, on the transport path thereof.

Accordingly, the product-to-be-transported decision unit 143 decides the product 20 at the work position B as a transport target and decides a transport destination as the work position C6.

The schedule creation unit 14 decides a product to be transported at present (a product to be transported first) through a series of processing described referring to FIGS. 2 to 9. The schedule creation device 10 creates an arrangement view (FIG. 3) of the products at the respective work positions after the decided present transport target product 20 is transported to the transport destination, executes processing, such as position level setting, priority setting, position level setting to a transport path, and decision of a transport target product, decides the product 20 to be transported next by the transport device, and creates a transport schedule.

FIG. 10 is a diagram showing an example of a schedule created by the schedule creation device in the embodiment of the invention.

FIG. 10 shows an example of a transport schedule created by the schedule creation device 10. The transport schedule of FIG. 10 shows that a transport device #1 transports a product "715LL" from the work position B to the work position C6 from 13:00 to 13:15 and transports a product "713LU" from the work position C5 to the work position D2 for 13:15 to 13:30. The same applies to after 13:30. The transport device #1 transports the product 20 waiting for transport at a certain work position to a work position of the next production process in compliance with the transport schedule. The output unit 12 outputs the transport schedule illustrated in FIG. 10 to the display device, other terminal devices, or the like.

As described above, with the schedule creation device 10, it is possible to create a transport schedule of a transport device with a low burden and at a high speed compared to a case where a transport schedule is created manually. Even though change occurs in a production schedule, it is possible to automatically create a transport schedule that quickly realizes a production schedule after change. With the schedule creation device 10, it is possible to create a transport schedule that does not cause useless movement of a transport device. PTL 1 does not describe that a schedule is created using a position level of each work position or a transport path and a priority of a product.

Hereinafter, a flow of the schedule creation processing will be described referring to FIGS. 11 to 16.

Figure 11:
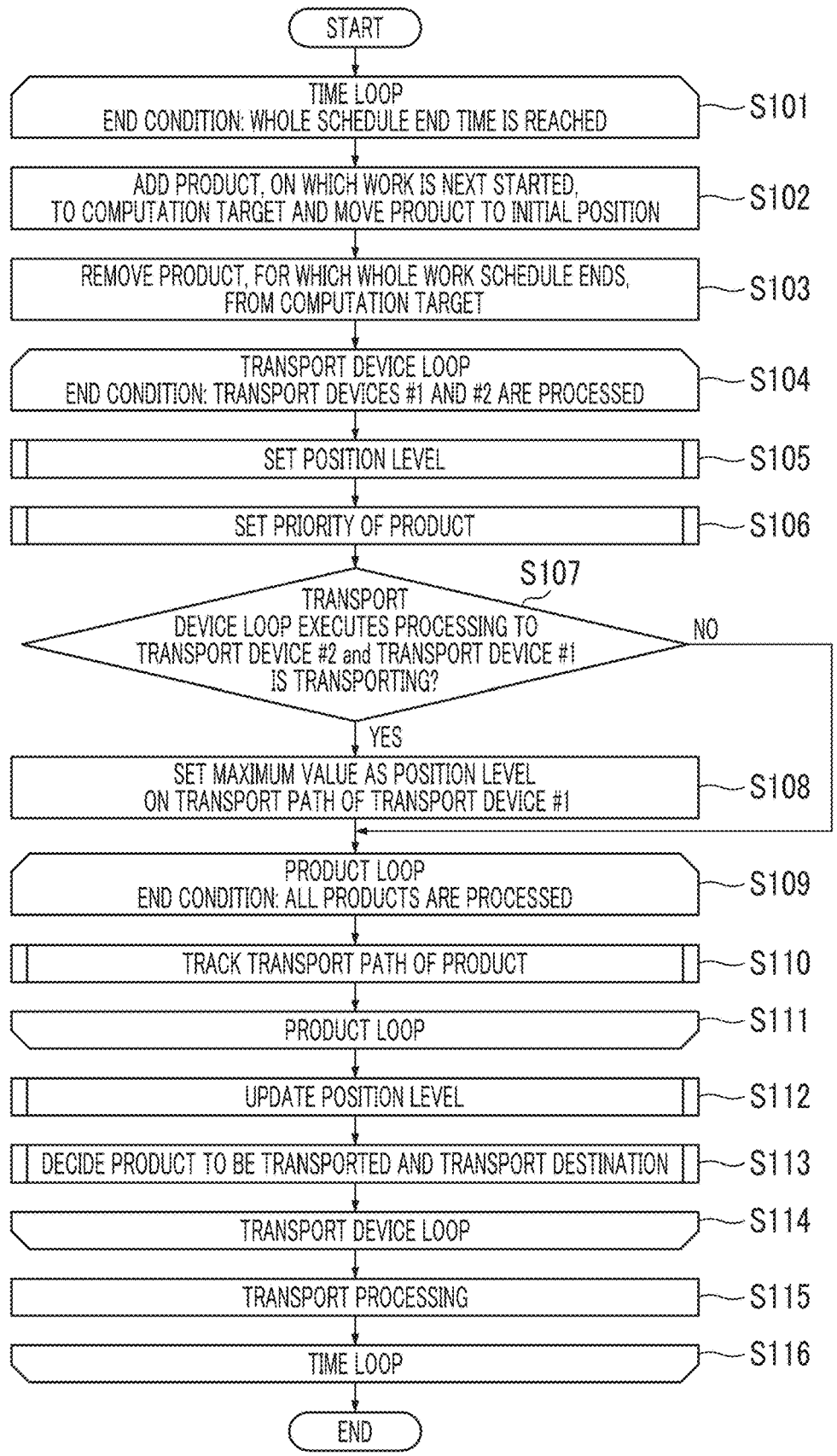
FIG. 11 is a flowchart of the schedule creation processing in the embodiment of the invention.

FIG. 11 is a flowchart of the schedule creation processing in the embodiment of the invention. As a premise, information necessary for the schedule creation processing, such as the production schedule, is registered in the storage unit 13.

The number of transport devices is two, and the priority of each work position is determined in advance. The arrangement of the work positions illustrated in FIGS. 2 to 9 will be described as an example.

The schedule creation unit 14 starts a time loop under an end condition that a time at which all transport schedules necessary for performing all productions determined in the production schedule end is reached (Step S101). For example, the schedule creation unit 14 executes the following processing every 15 minutes.

First, the schedule creation unit 14 adds a product, for which production work starts next (a product to be added to a production line), to a computation target, and moves the product to an initial position (Step S102). For example, the schedule creation unit 14 adds a new product 21 to a layout where scheduling target products are stored and associates the product with the initial work position A, a transport destination of the next work process, a transport path to the transport destination, and the like to create data having a structure corresponding to the arrangement view illustrated in FIG. 3 or the like.

The schedule creation unit 14 removes a product, for which a whole work schedule ends, from the computation target (Step S103). For example, the schedule creation unit 14 removes the product 20 at the final work position G, for which a whole work process ends, from the above-described layout. Hereinafter, the schedule creation unit 14 executes various kinds of processing on data having the structure corresponding to the arrangement view.

Next, the schedule creation unit 14 starts a transport device loop under an end condition that processing on the two transport devices #1 and #2 is completed (Step S104). First, processing of deciding a product to be transported by the transport device #1 is executed, and processing of deciding a product to be subsequently transported by the transport device #2 is executed.

First, the position level setting unit 141 performs the setting of the position level (Step S105). Here, details of position level setting processing will be described referring to FIG. 12. The position level setting processing is processing described referring to FIG. 3.

Figure 12:
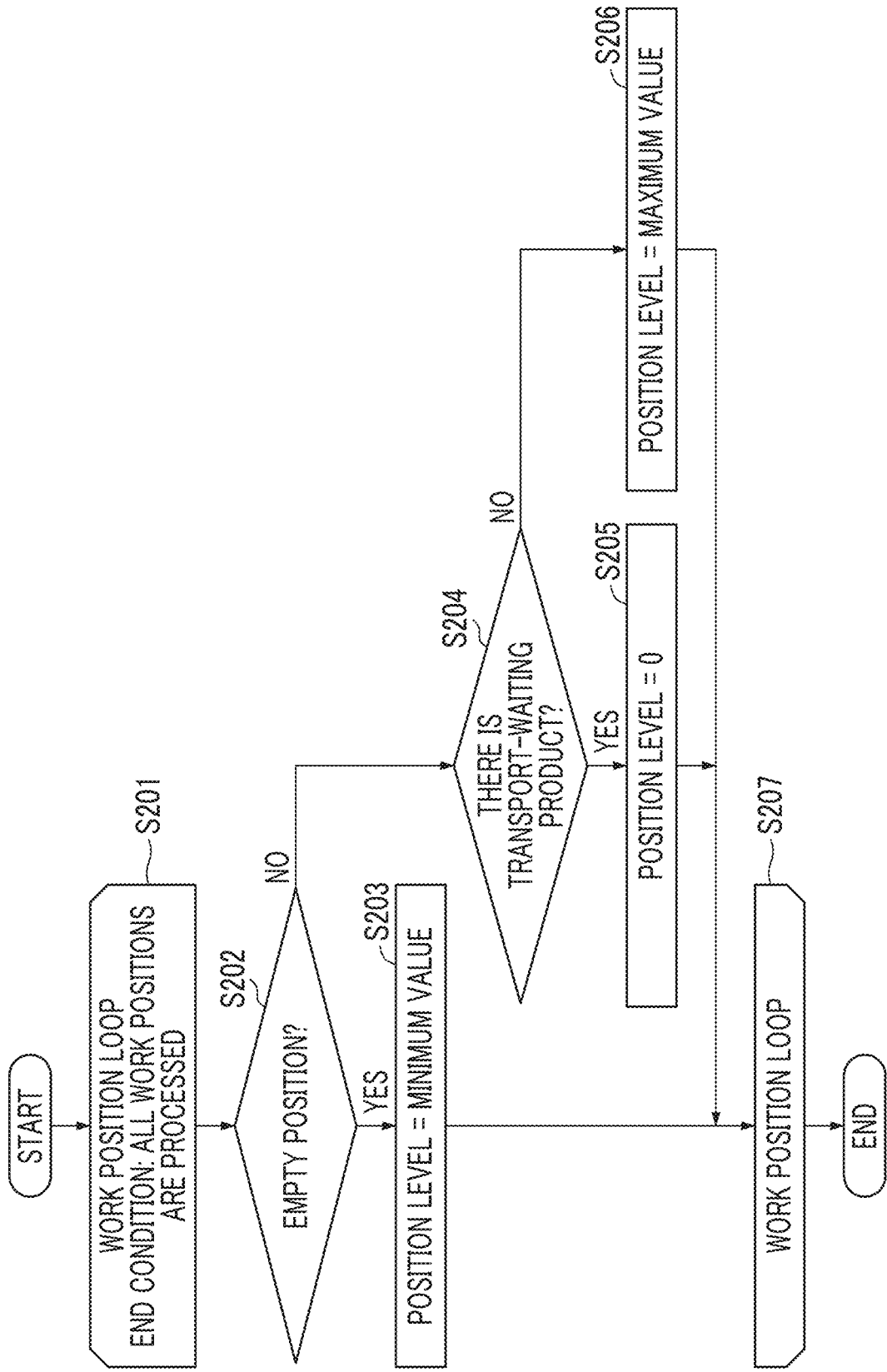
FIG. 12 is a flowchart of position level setting processing in the embodiment of the invention.

FIG. 12 is a flowchart of the position level setting processing in the embodiment of the invention.

The position level setting unit 141 starts a work position loop under an end condition that position level setting to all work positions is completed (Step S201). First, the position level setting unit 141 determines whether or not a first work position is an empty position (Step S202). An empty position is a work position where the product 20 or 21 is not present and that is not a transport destination of the product 20. In a case where a determination result is that the first work position is an empty position, the position level setting unit 141 sets a minimum value ("−999") as the position level of the work position (Step S203). In a case where the first work position is not an empty position, the position level setting unit 141 determines whether or not there is the transport-waiting product 20 at the present work position (Step S204). In a case where there is the product 20 or in a case where the present work position is the transport destination of the product 20, the position level setting unit 141 sets "0" as the position level of the work position (Step S205). In a case where the first work position is an empty position and the product 20 is not present, that is, in a case where there is the product 21, the position level setting unit 141 sets a maximum value ("999") as the position level of the work position (Step S206). When position level setting to all work positions is completed, the work position loop ends (Step S207).

Returning to FIG. 11, next, the priority setting unit 142 sets the priority of the product (Step S106). Here, details of priority setting processing will be described referring to FIG. 13. The priority setting processing is processing described referring to FIGS. 4 and 5.

Figure 13:
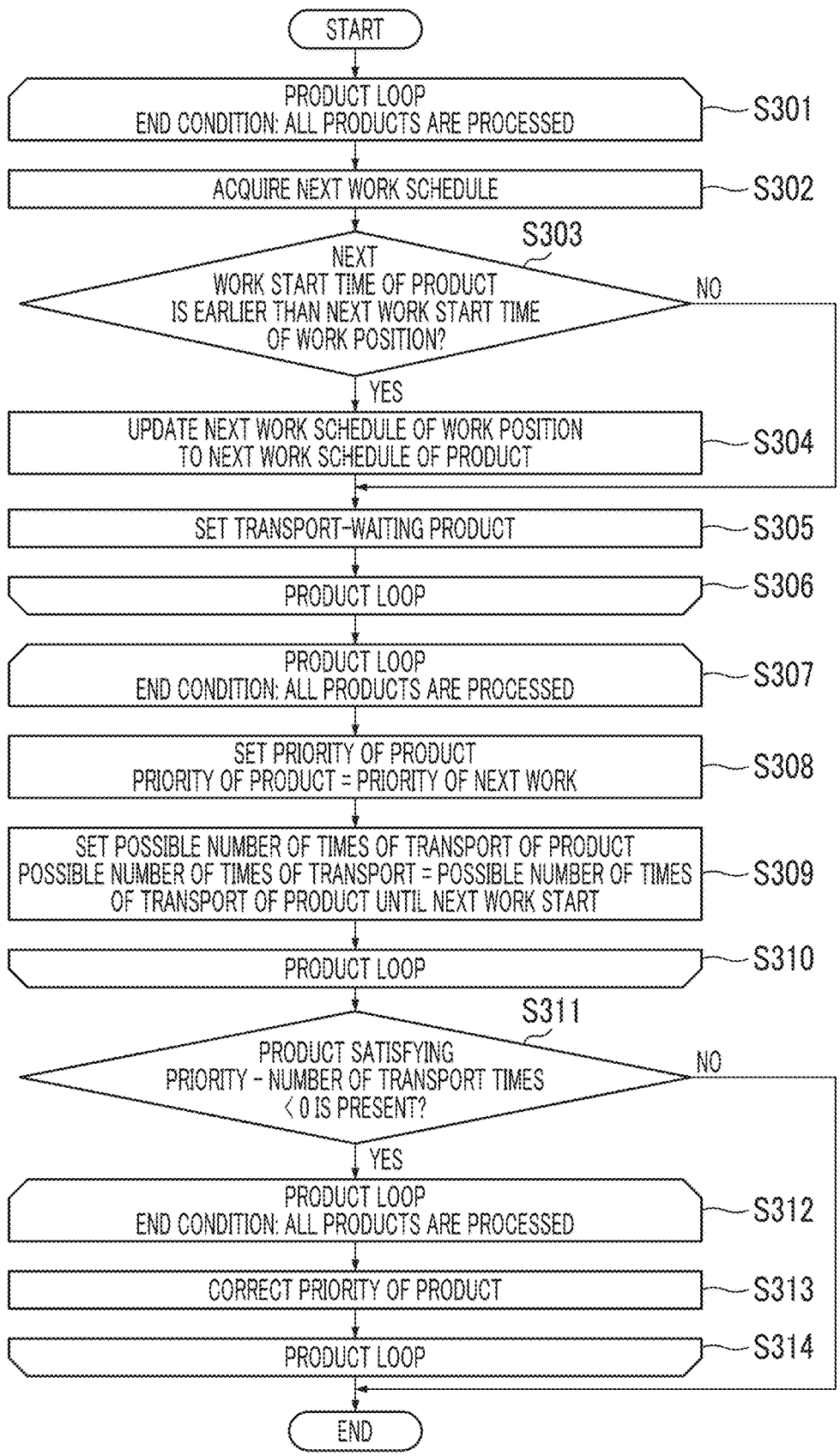
FIG. 13 is a flowchart of priority setting processing in the embodiment of the invention.

FIG. 13 is a flowchart of the priority setting processing in the embodiment of the invention.

First, the schedule creation unit 14 starts a product loop under an end condition that processing to all products is completed (Step S301). First, the schedule creation unit 14 acquires the next work schedule of a first product 20 or the like from the production schedule (Step S302). The schedule creation unit 14 determines whether or not the next work start time of the product 20 or the like is earlier than the next work start time at the next work position (Step S303). In a case where the next work start time of the product 20 or the like is earlier than the next work start time at the next work position, the schedule creation unit 14 updates the next work schedule at the next work position to the next work schedule of the product 20 or the like (Step S304). Next, the schedule creation unit 14 performs setting of which product is waiting for transport based on the production schedule (Step S305). The schedule creation unit 14 performs setting of whether or not the product is the transport-waiting product 20 on all products, for example, based on a current processing target time and the production schedule, and ends the product loop (Step S306).

Next, the priority setting unit 142 starts a product loop under an end condition that processing to all transport-waiting products 20 is completed (Step S307). The priority setting unit 142 sets priority to the product 20 (Step S308). Specifically, the priority setting unit 142 sets the priority p of the next work position to the product 20. Next, the priority setting unit 142 sets the possible number of times of transport (Step S309). Specifically, the priority setting unit 142 sets the number of times (the possible number of times t of transport) the product 20 can be transported until a production work start at the next work position. The priority setting unit 142 performs the setting of the priority p and the possible number of times t of transport on all products 20 and ends the product loop (Step S310).

Next, the priority setting unit 142 determines whether or not there is the product 20 satisfying a condition that the priority p—the possible number of times t of transport <0 (Step S311). In a case where the product 20 satisfying the above-described condition is present, product loop processing is executed on the product 20 (Step S312), and the priority of the product 20 is corrected to "1" (Step S313). When the correction to the product 20 satisfying the above-described condition ends for all products 20, the product loop processing ends (Step S314).

Returning to FIG. 11, next, the schedule creation unit 14 determines whether or not the processing to the transport device #1 is completed (Step S107). Specifically, the schedule creation unit 14 performs the determination of Step S107 according to that the transport device loop is executing processing to the transport device #2 and whether or not a transport instruction to the transport device #1 is output. In a case where both conditions are satisfied, the schedule creation unit 14 sets a maximum value ("999") as the position level on the transport path of the transport device #1 such that the transport devices #1 and #2 do not collide with each other (Step S108). Next, the process progresses to processing of Step S109 regardless of a determination result of Step S107.

Next, the priority setting unit 142 starts a product loop to all products 20 and 21 (Step S109), and executes transport path tracking processing (Step S110). Here, details of the transport path tracking processing will be described referring to FIG. 14. The transport path tracking processing is processing of updating a priority described referring to FIG. 6.

Figure 14:
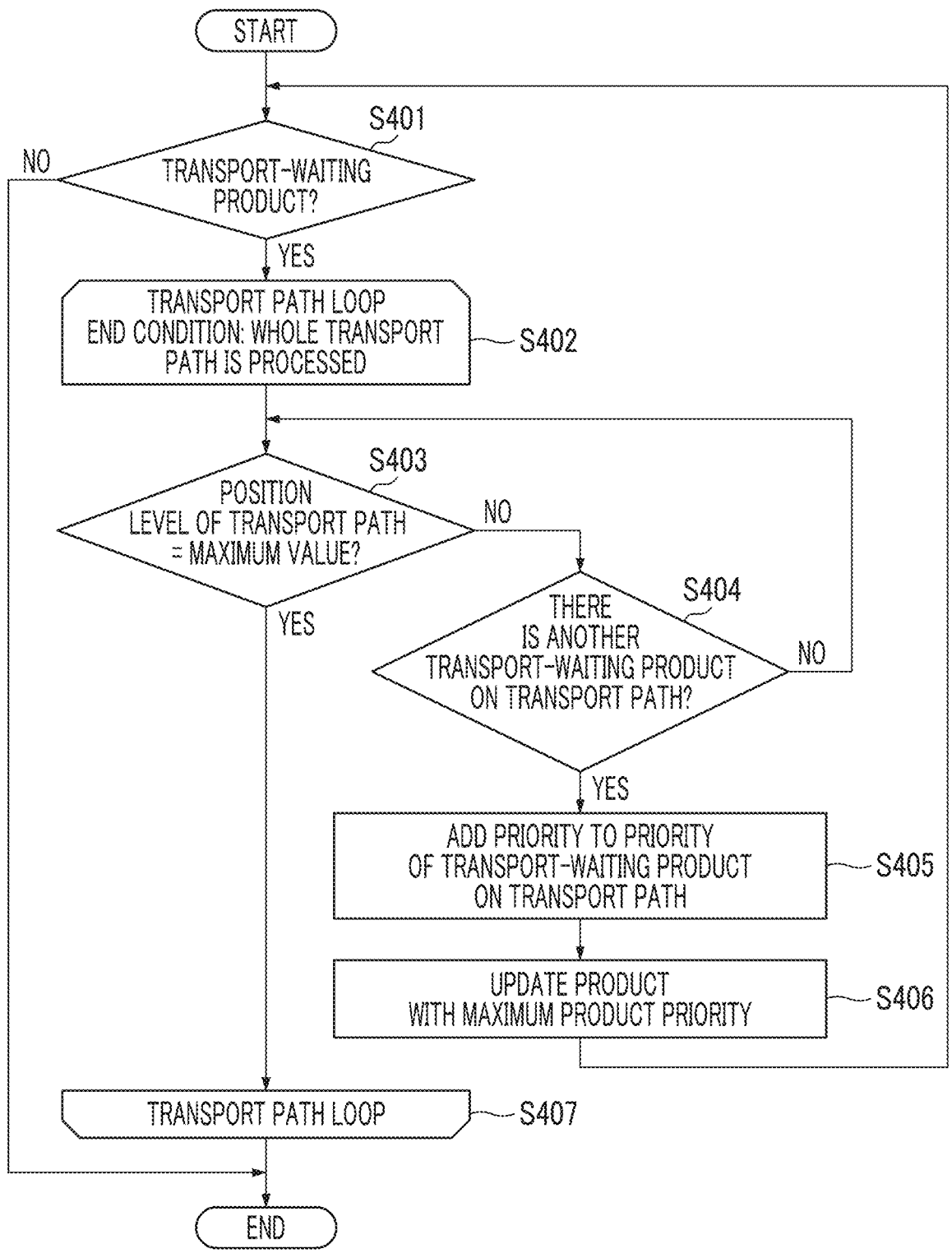
FIG. 14 is a flowchart of transport path tracking processing in the embodiment of the invention.

FIG. 14 is a flowchart of the transport path tracking processing in the embodiment of the invention.

The priority setting unit 142 determines whether or not the product 20 is the transport-waiting product 20 (Step S401). In a case where the product 20 is not the transport-waiting product 20, the processing of the flowchart is not executed and ends. In a case where the product 20 is the transport-waiting product 20, loop processing is executed on the whole transport path of the product 20 (Step S402). First, the priority setting unit 142 determines whether or not the position level of the transport path is a maximum value ("999") (Step S403). In a case where the position level of the transport path is the maximum value, the priority setting unit 142 does not perform the update of the position level to the transport path. In a case where the position level of the transport path is not the maximum value, the priority setting unit 142 determines whether or not there is another transport-waiting product 20 on the transport path (Step S404). In a case where there is no another transport-waiting product 20 on the transport path, nothing is performed. In a case where there is another transport-waiting product 20 on the transport path, the priority of the product 20 is added to the priority of the transport-waiting product 20 on the transport path (Step S405). Subsequently, the priority setting unit 142 updates the product 20 with the highest priority (Step S406). Specifically, the priority setting unit 142 compares the priority after addition with the priorities of the products 20 processed so far, and when the priority of the product 20 processed at present is greater, records the product 20 processed at present and the priority thereof in the storage unit 13. The product 20 with the highest priority is a transport target or a retraction target. When the update of the priority based on the position level of the transport path ends on one product 20, the transport path loop ends (Step S407). The priority setting unit 142 performs the transport path tracking processing on the next product 20, and when the transport path tracking processing of all products 20 is completed, ends the product loop (Step S111).

Next, the position level setting unit 141 performs the update of the position level (Step S112). Here, details of update processing of the position level will be described referring to FIG. 15. The update processing of the position level is processing described referring to FIG. 7.

Figure 15:
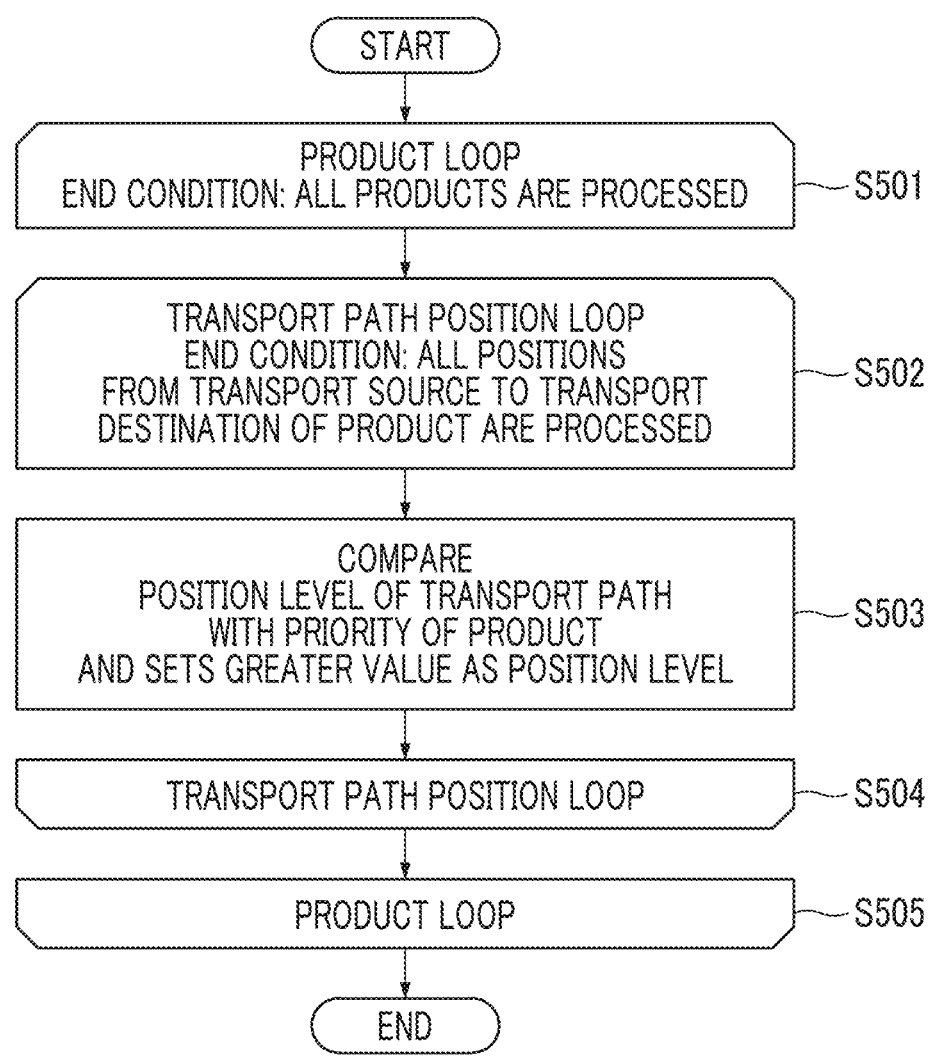
FIG. 15 is a flowchart of position level update processing in the embodiment of the invention.

FIG. 15 is a flowchart of the position level update processing in the embodiment of the invention.

The position level setting unit 141 starts a product loop under an end condition that processing to all products 20 is completed (Step S501). Furthermore, the position level setting unit 141 executes a transport path position loop under an end condition that, regarding the transport path of the processing target product 20, the processing on all positions (the places to each of which the position level is set) of the transport path is completed (Step S502). The position level setting unit 141 compares the position level of the transport path of the processing target with the priority of the processing target product 20 and sets a greater value as the position level of the transport path of the processing target (Step S503). When the processing to all transport path positions ends on one product 20, the transport path loop ends (Step S504). The position level setting unit 141 executes the processing of updating the position level of the transport path on the next product 20, and when the processing of all products 20 is completed, ends the product loop (Step S505).

Returning to FIG. 11, the product-to-be-transported decision unit 143 executes processing of deciding a product to be transported and a transport destination (Step S113). The processing is processing described referring to FIGS. 8 and 9.

Figure 16:
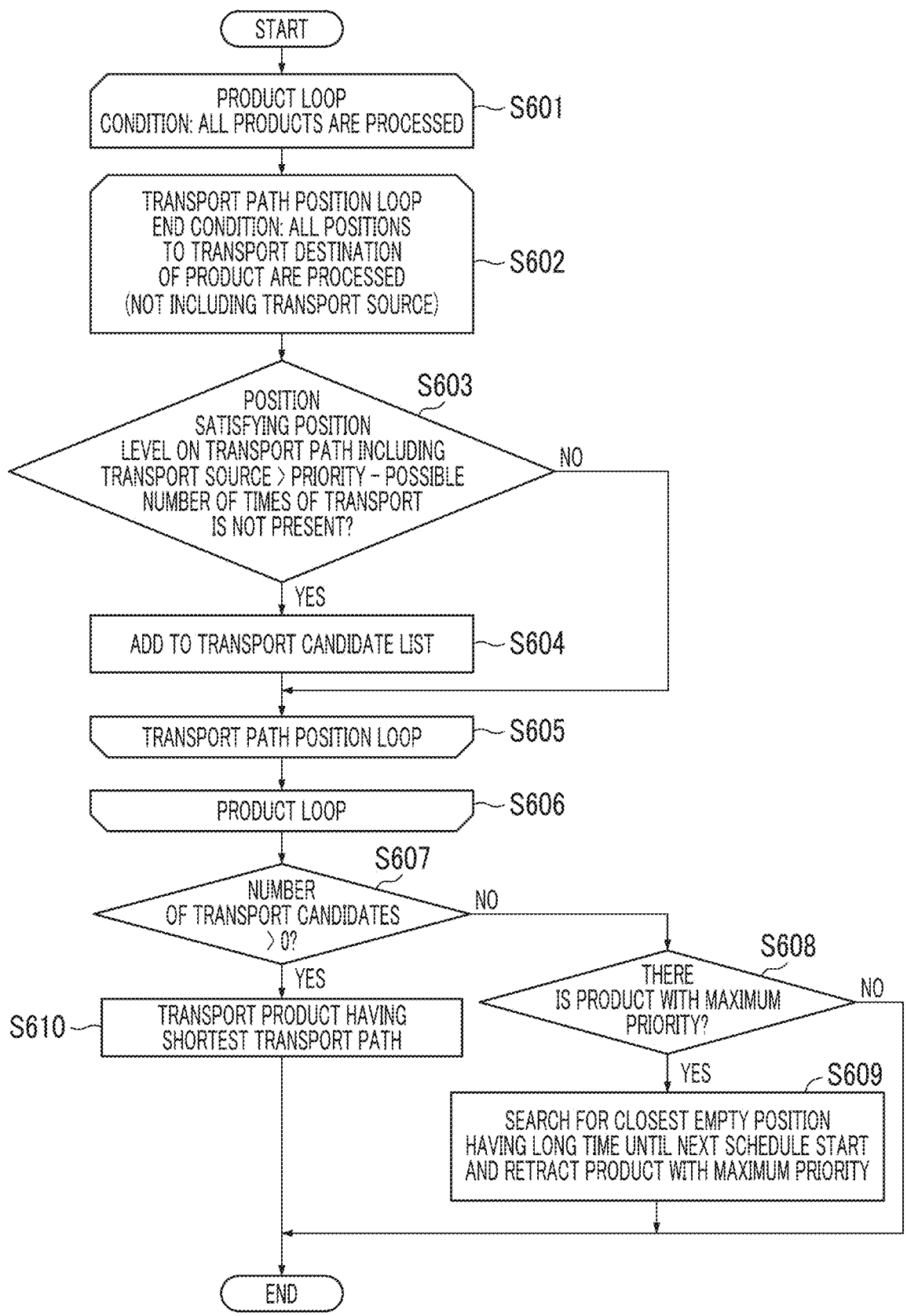
FIG. 16 is a flowchart of decision processing of a transport target in the embodiment of the invention.

FIG. 16 is a flowchart of decision processing of a transport target in the embodiment of the invention.

The product-to-be-transported decision unit 143 executes a product loop under a condition that all products 20 are processed (Step S601). Furthermore, the product-to-be-transported decision unit 143 executes a transport path position loop under an end condition that, regarding the transport path of the processing target product, the processing on all positions of the transport path excluding a transport source is completed (Step S602). First, the product-to-be-transported decision unit 143 determines whether or not a position satisfying a condition that the position level >the priority p–the possible number of times t of transport is present on the transport path including the transport destination on the processing target product 20 (Step S603). In a case where a position satisfying such a condition is not present, the product-to-be-transported decision unit 143 adds the product 20 to a transport candidate list (S604). In a case where there is a position, to which a value greater than the priority p–the possible number of times t of transport is set, on the transport path, the processing target product 20 is not added to the transport candidate list. When addition determination processing of all transport path positions of one product 20 to the transport candidate list ends, the transport path loop ends (Step S605). The position level setting unit 141 executes the addition determination processing to the transport candidate list on the next product 20, and when the processing of all products 20 is completed, ends the product loop (Step S606).

Next, the product-to-be-transported decision unit 143 determines whether or not the number of transport candidates added to the transport candidate list is greater than 0 (Step S607). In a case where the number of transport candidates is greater than 0 (in a case where a transport candidate is present), the product-to-be-transported decision unit 143 decides to transport a product having the shortest transport path (Step S610). For example, the product-to-be-transported decision unit 143 compares times required for transport between the work positions registered in the storage unit 13 on the products 20 added to the transport candidate list, and decides to transport the product 20 having the shortest time. Alternatively, the product-to-be-transported decision unit 143 may decide to transport the product 20, to which the highest priority is set, on the products 20 added to the transport candidate list. The highest priority is a value obtained by adding the priority of another product 20 on the transport path in the transport path tracking processing of Step S110 to a value obtained by subtracting the possible number of times t of transport from the priority p calculated in Step S106. The product-to-be-transported decision unit 143 allocates the product 20 decided to transport to the transport device #1, for example, in a case of the first transport device loop.

In a case where the determination in Step S607 is made that the number of transport candidates is 0, the product-to-be-transported decision unit 143 determines whether or not there is the product 20 with the highest priority (Step S608). For example, an example of the product 20 at the work position F2 described referring to FIG. 8 corresponds to a case where determination is made that "there is the product 20 having the maximum". In a case where the product 20 with the highest priority is present, the product-to-be-transported decision unit 143 searches for the closest empty position having a long time until the next schedule start and retracts the product 20 with the highest priority to the empty position. That is, the product-to-be-transported decision unit 143 decides the product 20 with the highest priority as a transport target (retraction target) (Step S609). The product-to-be-transported decision unit 143 allocates the product 20 decided to retract to, for example, the transport device #1. Through the processing of Steps S609 and S610, a production schedule on the transport device #1 is created. The output unit 12 outputs a transport instruction signal for instructing the transport device #1 to transport which product 20 from which work position to which another work position in compliance with the transport schedule.

When the product 20 to be transported is allocated to the transport device, the schedule creation unit 14 executes the processing after Step S105 on the transport device #2 and allocates the product 20 to the transport device #2. When the products 20 are allocated to the transport devices #1 and #2, the transport device loop ends (Step S114). The output unit 12 outputs the transport instruction signal to the transport device #2 in compliance with the transport schedule created by the schedule creation unit 14. The transport devices #1 and #2 execute transport processing (Step S115). When the single transport processing (for example, 15 minutes are taken) ends, the schedule creation unit 14 repeats the processing from Step S101 again. When the transport of the products 20 necessary until completion of production work planned by the production schedule ends, the schedule creation unit 14 ends the time loop (Step S116).

In the flowchart of FIG. 11, although transport is performed for the single transport processing and the next transport schedule is created, for example, a transport schedule for one day may be created before a work start on the day based on a production schedule for one day. For example, the transport processing of Step S115 is replaced with transport processing of a virtual product 20 (in terms of data) inside the schedule creation device 10 and calculates a correspondence relationship between the product 20 or 21 after transport and each work position. Then, processing of creating data having a structure corresponding to an arrangement view after transport and executing the next transport schedule creation processing (Steps S102 to S115) based on data is repeatedly executed. With this, it is possible to create a transport schedule for one day.

According to the embodiment, the position level indicating whether or not the transport device can pass is set to each work position or the transport path according to whether or not the product is in work at the work position corresponding to the work process. Furthermore, the priority of the product being manufactured is decided according to the priority of production work determined for each production process and the time until the production work start determined by the production schedule. In addition, the position level of the transport path to the transport destination is updated based on the priority of the product. Then, the product 20 to be transported first is decided according to the priority of the product and the position level of the transport path. With this, it is possible to create a transport schedule capable of preventing useless movement of a transport device and transporting a product being manufactured such that production work is advanced as the production schedule. It is possible to create a transport schedule that can be reasonably executed (for example, a situation in which another product 21 is present at the transport destination, or the like does not occur). In a case where there are a plurality of transport devices, when a product to be transported by one transport device is decided through the processing described referring to FIGS. 11 to 16 described above, the position level indicating impassable is set as the position level of the transport path through which the transport device passes. With this, it is possible to prevent interference between the transport devices.

Figure 17:
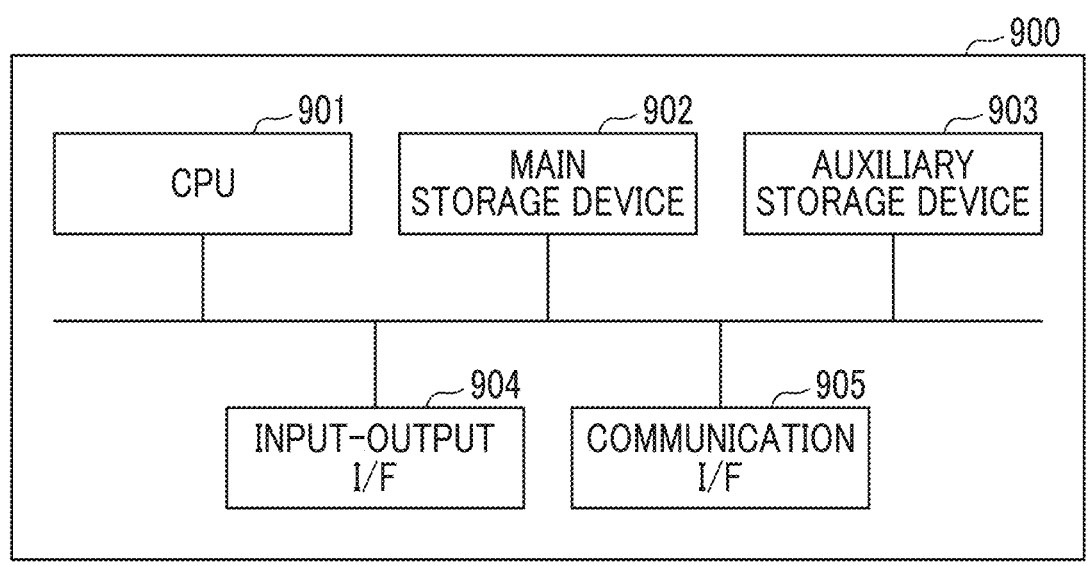
FIG. 17 is a diagram showing an example of the hardware configuration of the schedule creation device in the embodiment of the invention.

FIG. 17 is a diagram showing an example of the hardware configuration of the schedule creation device in the embodiment of the invention. A computer 900 is, for example, a personal computer (PC), a server terminal device, or the like including a CPU 901, a main storage device 902, an auxiliary storage device 903, an input-output interface 904, and a communication interface 905. The computer 900 may include a processor, such as a Micro Processing Unit (MPU) or a Graphics Processing Unit (GPU), instead of the CPU 901. The above-described schedule creation device 10 is implemented in the computer 900. Then, the operation of each processing unit described above is stored in the auxiliary storage device 903 in a format of a program. The CPU 901 reads the program from the auxiliary storage device 903, develops the program to the main storage device 902, and executes the above-described processing in compliance with the program. The CPU 901 secures a storage area corresponding to the storage unit 13 in the main storage device 902 in compliance with the program. The CPU 901 secures a storage area for storing data being processed in the auxiliary storage device 903 in compliance with the program.

In at least one embodiment, the auxiliary storage device 903 is an example of a non-transitory tangible medium. Other examples of the non-transitory tangible medium include a magnetic disc, a magneto-optical disc, a CD-ROM, a DVD-ROM, a semiconductor memory, or the like to be connected through the input-output interface 904. In a case where the program is distributed to the computer 900 through a communication line, the computer 900 that receives the program may develop the program to the main storage device 902 and may execute the above-described processing. The program may realize a part of the above-described functions. The program may be a so-called differential file (differential program) that realizes the above-described functions in combination with another program stored in the auxiliary storage device 903 in advance.

In addition, the components in the above-described embodiment may be appropriately replaced with known components without departing from the concept of the invention. The technical scope of the invention is not limited to the above-described embodiment, and various alterations may be made without departing from the concept of the present invention.

The position level is an example of a first score, and the priority is an example of a second score. A product being in work or being waiting for transport is an example of a situation in which a product is in production work.

INDUSTRIAL APPLICABILITY

With the schedule creation device, the schedule creation method, and the program described above, it is possible to automatically create a transport schedule of a transport device.

REFERENCE SIGNS LIST

10: schedule creation device
11: information acquisition unit
12: output unit
13: storage unit
14: schedule creation unit
141: position level setting unit
142: priority setting unit
143: product-to-be-transported decision unit
20: transport-waiting product
21: product in production work
900: computer
901: CPU
902: main storage device
903: auxiliary storage device
904: input-output interface
905: communication interface
A, B, C1 to C6, D1 to D3, E1 and E2, F1 and F2, P1 and P2: work position
Before A, before G, inside H, before door, before B, before C1 to before C6, before F1 to before F2: transport path

The invention claimed is:

1. A schedule creation device for creating a transport schedule of an automated transport device on which a product is transported to a work position determined for each production process by the automated transport device, based on a production schedule which is determined in advance and defines an execution time of a production work for each production process in a production line configured to perform the production work at the work position determined for each production process to manufacture the product, such that the production work is started at the execution time defined in the production schedule, the schedule creation device comprising:

a schedule creation unit configured to set a first score to the work position and a transport path of the automated transport device, set a second score to the product, and decide the product to be transported by the automated transport device from among the products present at a plurality of the work positions based on the first score and the second score, and an output unit configured to output an instruction to the automated transport device to cause the automated transport device to move along the transport path to transport the product decided by the schedule creation unit from a first work position within the plurality of the work positions to a second work position within the plurality of the work positions, wherein the production schedule is provided to the schedule creation device from outside, wherein the schedule creation unit is configured to set the first score based on whether or not passage of the automated transport device to the work position and the transport path is possible and set, based on a preset priority of each work position, the second score of the product present at the work position, wherein the first score is set to a value corresponding to a hardness of passage of the automated transport device, the second score is set to a value corresponding to a level of a priority of production work of the product with the second score set, and the schedule creation unit is configured to select the product having the second score set to a greater value than the first score set to the transport path of the product, to which the second score is set, as a transport candidate, wherein the schedule creation unit is configured to decide to retract the product, to which a maximum second score is set, in a case where there is no product to which the second score greater than the first score set to the transport path of the product is set, and wherein, in a case where there is a plurality of the automated transport devices, the schedule creation unit is configured to set the first score of the transport path, through which the automated transport device having already decided the product to transport passes, to a value such that passage of another automated transport device is impossible.

2. The schedule creation device according to claim 1, wherein the schedule creation unit is configured to set the first score to the work position based on presence or absence of the product present at the work position and a situation of production work to the product.

3. The schedule creation device according to claim 1, wherein the schedule creation unit is configured to set the second score based on a work start time at the work position determined in a predetermined production schedule in addition to the priority of each work position.

4. The schedule creation device according to any claim 1, wherein the schedule creation unit is configured to update the first score of the transport path, through which the automated transport device transporting the product passes, based on the second score of the product that is transported by the automated transport device.

5. The schedule creation device according to claim 1, wherein, when the product is allocated to the automated transport device, the schedule creation unit is configured to calculate a correspondence relationship between the work position after the product is transported and the product, calculate the first score after transport and the second score of the product based on the correspondence relationship, and decide the product to be transported next.

6. The schedule creation device according to claim 1, further comprising the automated transport device configured to move from the first work position to the second work position in response to receiving the instruction from the output unit.

7. The schedule creation device according to claim 1, wherein the schedule creation unit is configured to set the second score by calculating a possible number of times of transport by dividing a time until a production work start time at the work position determined in the production schedule by a time needed for transport, and subtracting the calculated possible number of times of transport from the second score.

8. A schedule creation method comprising, creating, using a schedule creation device, a transport schedule of an automated transport device on which a product is transported to a work position determined for each production process by the automated transport device, based on a production schedule which is determined in advance and defines an execution time of a production work for each production process in a production line configured to perform the production work at the work position determined for each production process to manufacture the product, such that the production work is started at the execution time defined in the production schedule, setting a first score to the work position and a transport path of the automated transport device, sets a second score to the product, and decides the product to be transported by the automated transport device from among the products at a plurality of the work positions based on the first score and the second score; and causing the automated transport device to move along the transport path to transport the product decided by the schedule creation unit from one work position within the plurality of the work positions to a second work position within the plurality of the work positions, wherein the production schedule is provided to the schedule creation device from outside, wherein the schedule creation unit is configured to set the first score based on whether or not passage of the automated transport device to the work position and the transport path is possible and set, based on a preset priority of each work position, the second score of the product present at the work position, wherein the first score is set to a value corresponding to a hardness of passage of the automated transport device, the second score is set to a value corresponding to a level of a priority of production work of the product with the second score set, and the schedule creation unit is configured to select the product having the second score set to a greater value than the first score set to the transport path of the product, to which the second score is set, as a transport candidate, wherein the schedule creation unit is configured to decide to retract the product, to which a maximum second score is set, in a case where there is no product to which the second score greater than the first score set to the transport path of the product is set, and wherein, in a case where there is a plurality of the automated transport devices, the schedule creation unit is configured to set the first score of the transport path, through which the automated transport device having already decided the product to transport passes, to a value such that passage of another automated transport device is impossible.

9. The schedule creation method according to claim 8, further comprising moving the automated transport device from the first work position to the second work position.

10. A program causing a computer of a schedule creation device to:

create a transport schedule of an automated transport device on which a product is transported to a work position determined for each production process by the automated transport device, based on a production schedule which is determined in advance and defines an execution time of a production work for each production process in a production line configured to perform the production work at the work position determined for each production process to manufacture the product, such that the production work is started at the execution time defined in the production schedule, set a first score to the work position and a transport path of the automated transport device;

set a second score to the product;

decide the product to be transported by the automated transport device from among the products present at a plurality of the work positions based on the first score and the second score; and cause the automated transport device to move along the transport path to transport the product decided by the schedule creation unit from one work position within the plurality of the work positions to a second work position within the plurality of the work positions, wherein the production schedule is provided to the schedule creation device from outside, wherein the schedule creation unit is configured to set the first score based on whether or not passage of the automated transport device to the work position and the transport path is possible and set, based on a preset priority of each work position, the second score of the product present at the work position, wherein the first score is set to a value corresponding to a hardness of passage of the automated transport device, the second score is set to a value corresponding to a level of a priority of production work of the product with the second score set, and the schedule creation unit is configured to select the product having the second score set to a greater value than the first score set to the transport path of the product, to which the second score is set, as a transport candidate, wherein the schedule creation unit is configured to decide to retract the product, to which a maximum second score is set, in a case where there is no product to which the second score greater than the first score set to the transport path of the product is set, and wherein, in a case where there is a plurality of the automated transport devices, the schedule creation unit is configured to set the first score of the transport path, through which the automated transport device having already decided the product to transport passes, to a value such that passage of another automated transport device is impossible.

11. The program according to claim 10, wherein the schedule creation device is further caused to move the automated transport device configured from the first work position to the second work position.

* * * * *